United States Patent
Kilfoy et al.

(10) Patent No.: US 12,555,307 B2
(45) Date of Patent: Feb. 17, 2026

(54) RENDERING AS A SERVICE PLATFORM WITH MODEL WORKFLOW AND CONVERSION

(71) Applicant: ROCKWELL AUTOMATION TECHNOLOGIES, INC., Mayfield Heights, OH (US)

(72) Inventors: Leo T. Kilfoy, San Diego, CA (US); Nabin Acharya, San Jose, CA (US); Gregory T. Berger, Scottsdale, AZ (US); Simon Blackwell, Kiln Farm (GB); Juan David Gonzalez Martinez, Medellin (CO); Ross Manson, Reading (GB); John H. Pritchard, Great Missenden (GB)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 146 days.

(21) Appl. No.: 18/396,540

(22) Filed: Dec. 26, 2023

(65) Prior Publication Data

US 2025/0209730 A1 Jun. 26, 2025

(51) Int. Cl.
*G06T 15/20* (2011.01)
*G06T 15/50* (2011.01)
(Continued)

(52) U.S. Cl.
CPC ............ *G06T 15/20* (2013.01); *G06T 15/506* (2013.01); *G06T 17/00* (2013.01); *G06T 19/00* (2013.01);
(Continued)

(58) Field of Classification Search
CPC ....... G06T 15/20; G06T 15/506; G06T 17/00; G06T 19/00; G06T 2200/24; G06T 2210/32
(Continued)

(56) References Cited

U.S. PATENT DOCUMENTS

| | | |
|---|---|---|
| 7,343,410 B2 | 3/2008 | Mercier et al. |
| 9,977,841 B1 | 5/2018 | Assaker et al. |

(Continued)

FOREIGN PATENT DOCUMENTS

| | | |
|---|---|---|
| CN | 101595510 A | 12/2009 |
| CN | 112699428 A | 4/2021 |

(Continued)

OTHER PUBLICATIONS

NVIDA Omniverse: The Platform for Connecting and Developing OpenUSD Applications. Retrieved from URL https://www.nvidia.com/en-us/omniverse on May 22, 2024.

(Continued)

*Primary Examiner* — Jin Ge
(74) *Attorney, Agent, or Firm* — Foley & Lardner LLP

(57) ABSTRACT

A method for generating a rendering of industrial equipment, the method comprising receiving a render request from a first remote data source, the render request identifying a three-dimensional (3D) model of the industrial equipment to be rendered, generating a virtual object request based on the render request, the virtual object request identifying a second remote data source comprising virtual object data associated with the 3D model to be rendered, receiving the virtual object data from the second remote data source based on the virtual object request, wherein the virtual object data is in a first format, generating a 3D model rendering based on the virtual object data, wherein the 3D model rendering is in a second format different than the first format, and transmitting the 3D model rendering to the first remote data source for use in representing the industrial equipment in an interactive environment.

20 Claims, 14 Drawing Sheets

(51) Int. Cl.
*G06T 17/00* (2006.01)
*G06T 19/00* (2011.01)

(52) U.S. Cl.
CPC ...... *G06T 2200/24* (2013.01); *G06T 2210/32* (2013.01)

(58) Field of Classification Search
USPC ........................................................ 345/426
See application file for complete search history.

(56) References Cited

U.S. PATENT DOCUMENTS

| | | |
|---|---|---|
| 10,339,721 B1 | 7/2019 | Dascola et al. |
| 10,582,182 B2 | 3/2020 | Gay et al. |
| 10,768,776 B1 | 9/2020 | Roche et al. |
| 11,803,175 B2 | 10/2023 | Jadhav et al. |
| 2003/0218615 A1 | 11/2003 | Gelb |
| 2005/0021656 A1 | 1/2005 | Callegari |
| 2007/0188488 A1 | 8/2007 | Choi |
| 2007/0218987 A1 | 9/2007 | Van Luchene et al. |
| 2010/0259781 A1 | 10/2010 | Nguyen |
| 2011/0304634 A1 | 12/2011 | Urbach |
| 2012/0060100 A1 | 3/2012 | Sherwood et al. |
| 2012/0113103 A1 | 5/2012 | Kim et al. |
| 2012/0274639 A1 | 11/2012 | Boy et al. |
| 2014/0125649 A1 | 5/2014 | Carlin |
| 2015/0251095 A1 | 9/2015 | Perrin |
| 2018/0137688 A1* | 5/2018 | Fulmer .................. G06T 15/20 |
| 2018/0150989 A1 | 5/2018 | Mitsui et al. |
| 2018/0182160 A1 | 6/2018 | Boulton et al. |
| 2019/0287307 A1 | 9/2019 | Rogers et al. |
| 2020/0357169 A1 | 11/2020 | Casella et al. |
| 2020/0402294 A1* | 12/2020 | Yerli .................... G06T 15/005 |
| 2021/0012578 A1* | 1/2021 | Brimhall ................ G06T 19/20 |
| 2021/0352126 A1 | 11/2021 | Stevenson et al. |
| 2021/0358188 A1 | 11/2021 | Lebaredian et al. |
| 2022/0254114 A1 | 8/2022 | Frederick et al. |
| 2023/0177594 A1 | 6/2023 | Besecker et al. |
| 2023/0181258 A1 | 6/2023 | Roh et al. |
| 2023/0185425 A1 | 6/2023 | Delfino |
| 2024/0119658 A1 | 4/2024 | Chu et al. |

FOREIGN PATENT DOCUMENTS

| | | | | |
|---|---|---|---|---|
| CN | 115292014 | * | 11/2022 | ............... G06F 9/48 |
| CN | 115564903 A | * | 12/2022 | ............. G06T 17/00 |
| KR | 20140003741 A | | 1/2014 | |
| WO | WO2025061736 | * | 9/2023 | ............. G06T 17/00 |

OTHER PUBLICATIONS

Non-Final Office Action for U.S. Appl. No. 18/396,516, dated Aug. 13, 2025.
Adobe. Interacting with 3D models [Online]. Sep. 19, 2023 [Retrieved on Aug. 26, 2025]. Retrieved from the Internet: <URL: https://helpx.adobe.com/acrobat/using/interacting-3d-models.html > (Year: 2023).
Non-Final Office Action for U.S. Appl. No. 18/396,500, dated Sep. 9, 2025.
Non-Final Office Action for U.S. Appl. No. 18/396,530, dated Sep. 4, 2025.
Final Office Action for U.S. Appl. No. 18/396,516, dated Nov. 5, 2025.
Final Office Action for U.S. Appl. No. 18/396,530, dated Nov. 7, 2025.
Screen captures from YouTube video clip entitled "Video Tech Tip: Modify Camera Paths in SOLIDWORKS Composer," uploaded on Mar. 5, 2019 by user "Tn' Mech". Retrieved from Internet: <https://WWW.youtube.com/watch?v =—FNaYtlanok>. (Year: 2019).

* cited by examiner

RENDERING AS A SERVICE PLATFORM WITH MODEL WORKFLOW AND CONVERSION

BACKGROUND

The present disclosure relates generally to a web services system, and more particularly to a web services system configured to generate a rendering of industrial equipment.

SUMMARY

One implementation of the present disclosure is a Rendering as a Service (RaaS) platform for generating a rendering of industrial equipment, the RaaS platform comprising one or more memory devices having instructions stored thereon that, when executed by one or more processors, cause the one or more processors to perform operations comprising receiving, via a graphical user interface presented on a user device, a first user selection of a three-dimensional (3D) model of the industrial equipment, receiving, via the graphical user interface, a second user selection of one or more rendering options from a plurality of selectable rendering options presented via the graphical user interface, obtaining, at the RaaS platform based on the first user selection, the 3D model of the industrial equipment from a remote data source, and executing a rendering job, based on the first user selection of the 3D model and the second user selection of the one or more rendering options, to generate the rendering of the industrial equipment.

In some embodiments, the operations further comprise receiving, along with the first user selection of the 3D model, a third user selection of a rendering format, and wherein executing the rendering job to generate the rendering of the industrial equipment includes generating the rendering of the industrial equipment in the selected rendering format.

In some embodiments, the selected rendering format is a universal scene description file format.

In some embodiments, the selected rendering format is an image file format.

In some embodiments, the operations further comprise receiving, along with the first user selection of the 3D model, a third user selection of at least one of a view or a resolution of the rendering to be generated, and wherein executing the rendering job to generate the rendering of the industrial equipment includes generating the rendering based on the third user selection.

In some embodiments, obtaining the 3D model of the industrial equipment includes obtaining the 3D model in a first format, and wherein generating the rendering of the industrial equipment includes generating the rendering of the industrial equipment in a second format different than the first format.

In some embodiments, the first format is a 3D virtual model data format, and wherein the second format is a universal scene description file format.

In some embodiments, the remote data source comprises at least one of a virtual modeling application, a commissioning application, a storage application, or local storage of the user device.

In some embodiments, the operations further comprise transmitting the rendering of the industrial equipment from the RaaS platform to a metaverse platform for use in representing the industrial equipment in an interactive virtual environment.

Another implementation of the present disclosure is a system for generating a rendering of industrial equipment, the system comprising one or more memory devices having instructions stored thereon that, when executed by one or more processors, cause the one or more processors to perform operations comprising receiving, via a graphical user interface presented on a user device, a first user selection of a three-dimensional (3D) model of the industrial equipment, receiving, via the graphical user interface, a second user selection of one or more rendering options from a plurality of selectable rendering options presented via the graphical user interface, obtaining, based on the first user selection, the 3D model of the industrial equipment from a remote data source, and executing a rendering job, based on the first user selection of the 3D model and the second user selection of the one or more rendering options, to generate the rendering of the industrial equipment.

In some embodiments, the operations further comprise receiving, along with the first user selection of the 3D model, a third user selection of a rendering format, and wherein executing the rendering job to generate the rendering of the industrial equipment includes generating the rendering of the industrial equipment in the selected rendering format.

In some embodiments, the selected rendering format is a universal scene description file format.

In some embodiments, the selected rendering format is an image file format.

In some embodiments, the operations further comprise receiving, along with the first user selection of the 3D model, a third user selection of at least one of a view or a resolution of the rendering to be generated, and wherein executing the rendering job to generate the rendering of the industrial equipment includes generating the rendering based on the third user selection.

In some embodiments, obtaining the 3D model of the industrial equipment includes obtaining the 3D model in a first format, and wherein generating the rendering of the industrial equipment includes generating the rendering of the industrial equipment in a second format different than the first format.

In some embodiments, the first format is a 3D virtual model data format, and wherein the second format is a universal scene description file format.

Another implementation of the present disclosure is a non-transitory computer readable medium comprising instructions stored thereon that, when executed by one or more processors, cause the one or more processors to receive, via a graphical user interface presented on a user device, a first user selection of a three-dimensional (3D) model of the industrial equipment, receive, via the graphical user interface, a second user selection of one or more rendering options from a plurality of selectable rendering options presented via the graphical user interface, obtain, based on the first user selection, the 3D model of the industrial equipment from a remote data source, and execute a rendering job, based on the first user selection of the 3D model and the second user selection of the one or more rendering options, to generate the rendering of the industrial equipment.

In some embodiments, the instructions further cause the one or more processors to receive, along with the first user selection of the 3D model, a third user selection of a rendering format, and wherein executing the rendering job to generate the rendering of the industrial equipment includes generating the rendering of the industrial equipment in the selected rendering format.

In some embodiments, the selected rendering format is a universal scene description file format.

In some embodiments, the selected rendering format is an image file format.

Another implementation of the present disclosure is a method for generating a rendering of industrial equipment for use in an interactive virtual environment within a metaverse platform, the method comprising receiving, from the metaverse platform, a render request identifying a three-dimensional (3D) model of the industrial equipment to be rendered, generating and communicating to the metaverse platform, a virtual object request based on the render request, the virtual object request requesting virtual object data associated with the 3D model to be rendered, receiving, from the metaverse platform, virtual object data based on the virtual object request, wherein the virtual object data is in a first format, and generating and transmitting, to the metaverse platform and based on the virtual object data, a 3D model rendering for use in representing the industrial equipment in the interactive virtual environment within the metaverse platform, wherein the 3D model rendering is generated in a second format different than the first format.

In some embodiments, the render request is an automated render request.

In some embodiments, the render request includes a perspective or viewpoint of a virtual camera from which to view the 3D model when generating the 3D model rendering.

In some embodiments, the render request includes an identification of a light source used to illuminate the 3D model when generating the 3D model rendering.

In some embodiments, the render request includes an identification of a placement of the light source used when generating the 3D model rendering.

In some embodiments, the render request includes an identification of a movement path of a virtual camera in a 3D space around or through components of the 3D model when generating the 3D model rendering, wherein the 3D model rendering is from a perspective of the virtual camera and the virtual camera moves along the movement path.

In some embodiments, receiving the virtual object data in the first format includes receiving the virtual object data in a 3D virtual model data format, and wherein generating the 3D model rendering in the second format includes generating the 3D model rendering in a universal scene description file format.

In some embodiments, receiving the virtual object data in the first format includes receiving the virtual object data in a 3D virtual model data format, and wherein generating the 3D model rendering in the second format includes generating the 3D model rendering in an image or video file format.

Another implantation of the present disclosure is a system for generating a rendering of industrial equipment for use in an interactive virtual environment within a metaverse platform, the system comprising one or more memory devices having instructions stored thereon that, when executed by one or more processors, cause the one or more processors to perform operations comprising receiving, from the metaverse platform, a render request identifying a three-dimensional (3D) model of the industrial equipment to be rendered, generating and communicating to the metaverse platform, a virtual object request based on the render request, the virtual object request requesting virtual object data associated with the 3D model to be rendered, receiving, from the metaverse platform, virtual object data based on the virtual object request, wherein the virtual object data is in a first format, and generating and transmitting, to the metaverse platform and based on the virtual object data, a 3D model rendering for use in representing the industrial equipment in the interactive virtual environment within the metaverse platform, wherein the 3D model rendering is generated in a second format different than the first format.

In some embodiments, the render request is an automated render request.

In some embodiments, the render request includes a perspective or viewpoint of a virtual camera from which to view the 3D model when generating the 3D model rendering.

In some embodiments, the render request includes an identification of a light source used to illuminate the 3D model when generating the 3D model rendering.

In some embodiments, the render request includes an identification of a placement of the light source used when generating the 3D model rendering.

In some embodiments, the render request includes an identification of a movement path of a virtual camera in a 3D space around or through components of the 3D model when generating the 3D model rendering, wherein the 3D model rendering is from a perspective of the virtual camera and the virtual camera moves along the movement path.

In some embodiments, receiving the virtual object data in the first format includes receiving the virtual object data in a 3D virtual model data format, and wherein generating the 3D model rendering in the second format includes generating the 3D model rendering in a universal scene description file format.

In some embodiments, receiving the virtual object data in the first format includes receiving the virtual object data in a 3D virtual model data format, and wherein generating the 3D model rendering in the second format includes generating the 3D model rendering in an image or video file format.

Another implementation of the present disclosure is a non-transitory computer readable medium comprising instructions stored thereon that, when executed by one or more processors, cause the one or more processors to receive, from the metaverse platform, a render request identifying a three-dimensional (3D) model of the industrial equipment to be rendered, generate and communicating to the metaverse platform, a virtual object request based on the render request, the virtual object request requesting virtual object data associated with the 3D model to be rendered, receive, from the metaverse platform, virtual object data based on the virtual object request, wherein the virtual object data is in a first format, and generate and transmit, to the metaverse platform and based on the virtual object data, a 3D model rendering for use in representing the industrial equipment in the interactive virtual environment within the metaverse platform, wherein the 3D model rendering is generated in a second format different than the first format.

In some embodiments, the render request is an automated render request.

In some embodiments, the render request includes a perspective or viewpoint of a virtual camera from which to view the 3D model when generating the 3D model rendering.

In some embodiments, the render request includes an identification of a light source used to illuminate the 3D model when generating the 3D model rendering.

Another implantation of the present disclosure is a Rendering as a Service (RaaS) platform for generating a rendering of industrial equipment, the RaaS platform comprising one or more memory devices having instructions stored thereon that, when executed by one or more processors, cause the one or more processors to perform operations comprising generating, at the RaaS platform, a graphical representation of a plurality of selectable rendering options based on a 3D model of the industrial equipment, the graphical representation of the plurality of selectable rendering options comprising a plurality of views of the 3D model from a plurality of different viewpoints of a virtual camera and user-selectable options for selecting one or more of the plurality of views, transmitting the graphical representation of the plurality of selectable rendering options from the RaaS platform to a user device for presentation via a graphical user interface of the user device, receiving, at the RaaS platform, a user selection of one or more rendering options from the plurality of selectable rendering options presented via the graphical user interface of the user device, and executing a rendering job, at the RaaS platform based on the 3D model and the user selection of the one or more rendering options, to generate the rendering of the industrial equipment.

In some embodiments, the plurality of selectable rendering options comprise an identification of a light source used to illuminate the 3D model of industrial equipment when generating the rendering of the industrial equipment.

In some embodiments, the plurality of selectable rendering options comprise an identification of a placement of a light source used to illuminate the 3D model of industrial equipment when generating the rendering of the industrial equipment.

In some embodiments, the plurality of selectable rendering options comprise an identification of a viewpoint of the 3D model of industrial equipment used when generating the rendering of the industrial equipment.

In some embodiments, the plurality of selectable rendering options comprise an identification of a center point of the 3D model of industrial equipment used when generating the rendering of the industrial equipment.

In some embodiments, the plurality of selectable rendering options comprise an identification of a distance of the virtual camera from the center point of the 3D model, wherein the rendering of the industrial equipment is from a perspective of the virtual camera.

In some embodiments, the plurality of selectable rendering options comprises an identification of a movement path of the virtual camera in a 3D space around or through components of the 3D model when generating the rendering of the industrial equipment, wherein the industrial equipment rendering is from a perspective of the virtual camera and the virtual camera moves along the movement path.

Another implementation of the present disclosure is a system for generating a rendering of industrial equipment, the system comprising one or more memory devices having instructions stored thereon that, when executed by one or more processors, cause the one or more processors to perform operations comprising generating a graphical representation of a plurality of selectable rendering options based on a 3D model of the industrial equipment, the graphical representation of the plurality of selectable rendering options comprising a plurality of views of the 3D model from a plurality of different viewpoints of a virtual camera and user-selectable options for selecting one or more of the plurality of views, transmitting the graphical representation of the plurality of selectable rendering options to a user device for presentation via a graphical user interface of the user device, receiving a user selection of one or more rendering options from the plurality of selectable rendering options presented via the graphical user interface of the user device, and executing a rendering job, based on the 3D model and the user selection of the one or more rendering options, to generate the rendering of the industrial equipment.

In some embodiments, the plurality of selectable rendering options comprise an identification of a light source used to illuminate the 3D model of industrial equipment when generating the rendering of the industrial equipment.

In some embodiments, the plurality of selectable rendering options comprise an identification of a placement of a light source used to illuminate the 3D model of industrial equipment when generating the rendering of the industrial equipment.

In some embodiments, the plurality of selectable rendering options comprise an identification of a viewpoint of the 3D model of industrial equipment used when generating the rendering of the industrial equipment.

In some embodiments, the plurality of selectable rendering options comprise an identification of a center point of the 3D model of industrial equipment used when generating the rendering of the industrial equipment.

In some embodiments, the plurality of selectable rendering options comprise an identification of a distance of the virtual camera from the center point of the 3D model, wherein the rendering of the industrial equipment is from a perspective of the virtual camera.

In some embodiments, the plurality of selectable rendering options comprises an identification of a movement path of the virtual camera in a 3D space around or through components of the 3D model when generating the rendering of the industrial equipment, wherein the industrial equipment rendering is from a perspective of the virtual camera and the virtual camera moves along the movement path.

Another implementation of the present disclosure is a non-transitory computer readable medium comprising instructions stored thereon that, when executed by one or more processors, cause the one or more processors to generate a graphical representation of a plurality of selectable rendering options based on a 3D model of the industrial equipment, the graphical representation of the plurality of selectable rendering options comprising a plurality of views of the 3D model from a plurality of different viewpoints of a virtual camera and user-selectable options for selecting one or more of the plurality of views, transmit the graphical representation of the plurality of selectable rendering options to a user device for presentation via a graphical user interface of the user device, receive a user selection of one or more rendering options from the plurality of selectable rendering options presented via the graphical user interface of the user device, and execute a rendering job, based on the 3D model and the user selection of the one or more rendering options, to generate the rendering of the industrial equipment.

In some embodiments, the plurality of selectable rendering options comprise an identification of a light source used to illuminate the 3D model of industrial equipment when generating the rendering of the industrial equipment.

In some embodiments, the plurality of selectable rendering options comprise an identification of a placement of a light source used to illuminate the 3D model of industrial equipment when generating the rendering of the industrial equipment.

In some embodiments, the plurality of selectable rendering options comprise an identification of a viewpoint of the 3D model of industrial equipment used when generating the rendering of the industrial equipment.

In some embodiments, the plurality of selectable rendering options comprise an identification of a center point of the 3D model of industrial equipment used when generating the rendering of the industrial equipment.

In some embodiments, the plurality of selectable rendering options comprise an identification of a distance of the virtual camera from the center point of the 3D model, wherein the rendering of the industrial equipment is from a perspective of the virtual camera.

Another implementation of the present disclosure is a method for generating a rendering of industrial equipment, the method comprising receiving a render request from a first remote data source, the render request identifying a three-dimensional (3D) model of the industrial equipment to be rendered, generating a virtual object request based on the render request, the virtual object request identifying a second remote data source comprising virtual object data associated with the 3D model to be rendered, receiving the virtual object data from the second remote data source based on the virtual object request, wherein the virtual object data is in a first format, generating a 3D model rendering based on the virtual object data, wherein the 3D model rendering is in a second format different than the first format, and transmitting the 3D model rendering to the first remote data source for use in representing the industrial equipment in an interactive environment.

In some embodiments, the method further comprises generating, based on the render request, a plurality of job tasks associated with generating the 3D model rendering; and
generating, based on an ordering of the plurality of job tasks, a jobs task queue.

In some embodiments, the method further comprises generating task data based on the jobs task queue, wherein the task data includes a batch of job tasks selected from the plurality of job tasks of the jobs task queue.

In some embodiments, the method further comprises generating, based on the task data, a rendering task request, wherein the rendering task request includes a batch of tasks selected from a plurality of tasks associated with generating the 3D model rendering.

In some embodiments, the render request includes a perspective or viewpoint of a virtual camera from which to view the 3D model when generating the 3D model rendering.

In some embodiments, the first remote data source is a user interface of a user device and the second remote data source is a memory device of the user device.

In some embodiments, the first remote data source is a virtual modeling application, and wherein the first remote data source and the second remote data source are different.

In some embodiments, the first remote data source is a metaverse platform, and wherein transmitting the 3D model rendering includes transmitting the 3D model rendering to the metaverse platform for use in representing the industrial equipment in an interactive virtual environment.

In some embodiments, the render request includes at least one of an identification of a light source used to illuminate the 3D model when generating the 3D model rendering, a light source placement used when generating the 3D model rendering, an identification of a movement path of a virtual camera in a 3D space around or through components of the 3D model, wherein the 3D model rendering is from a perspective of the virtual camera as the virtual camera moves along the movement path.

In some embodiments, receiving the virtual object data in the first format includes receiving the virtual object data in a 3D virtual model data format, and wherein generating the 3D model rendering in the second format includes generating the 3D model rendering in a universal scene description file format.

In some embodiments, receiving the virtual object data in the first format includes receiving the virtual object data in a 3D virtual model data format, and wherein generating the 3D model rendering in the second format includes generating the 3D model rendering in an image or video file format.

Another implementation of the present disclosure is a system for generating a rendering of industrial equipment, the system comprising one or more memory devices having instructions stored thereon that, when executed by one or more processors, cause the one or more processors to perform operations comprising receiving a render request from a first remote data source, the render request identifying a three-dimensional (3D) model of the industrial equipment to be rendered, generating a virtual object request based on the render request, the virtual object request identifying a second remote data source comprising virtual object data associated with the 3D model to be rendered, receiving the virtual object data from the second remote data source based on the virtual object request, wherein the virtual object data is in a first format, generating a 3D model rendering based on the virtual object data, wherein the 3D model rendering is in a second format different than the first format, and transmitting the 3D model rendering to the first remote data source for use in representing the industrial equipment in an interactive environment.

In some embodiments, the operations further comprise generating, based on the render request, a plurality of job tasks associated with generating the 3D model rendering, and generating, based on an ordering of the plurality of job tasks, a jobs task queue.

In some embodiments, the operations further comprise generating task data based on the jobs task queue, wherein the task data includes a batch of job tasks selected from the plurality of job tasks of the jobs task queue.

In some embodiments, the operations further comprise generating, based on the task data, a rendering task request, wherein the rendering task request includes a batch of tasks selected from a plurality of tasks associated with generating the 3D model rendering.

In some embodiments, the render request includes a perspective or viewpoint of a virtual camera from which to view the 3D model when generating the 3D model rendering.

Another implementation of the present disclosure is a non-transitory computer readable medium comprising instructions stored thereon that, when executed by one or more processors, cause the one or more processors to receive a render request from a first remote data source, the render request identifying a three-dimensional (3D) model of the industrial equipment to be rendered, generate a virtual object request based on the render request, the virtual object request identifying a second remote data source comprising virtual object data associated with the 3D model to be rendered, receive the virtual object data from the second remote data source based on the virtual object request, wherein the virtual object data is in a first format, generate a 3D model rendering based on the virtual object data, wherein the 3D model rendering is in a second format different than the first format, and transmit the 3D model rendering to the first remote data source for use in representing the industrial equipment in an interactive environment.

In some embodiments, the instructions further cause the one or more processors to generate, based on the render request, a plurality of job tasks associated with generating the 3D model rendering, and generate, based on an ordering of the plurality of job tasks, a jobs task queue.

In some embodiments, the instructions further cause the one or more processors to generate task data based on the jobs task queue, wherein the task data includes a batch of job tasks selected from the plurality of job tasks of the jobs task queue.

In some embodiments, the instructions further cause the one or more processors to generate, based on the task data, a rendering task request, wherein the rendering task request includes a batch of tasks selected from a plurality of tasks associated with generating the 3D model rendering.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Referring generally to the FIGURES, systems and methods for generating and/or providing a rendering of industrial equipment. For example, systems may be configured to receive a first user selection of a three-dimensional (3D) model of the industrial equipment and a second user selection of one or more rendering options, obtain (e.g., based on the first user selection) the 3D model of industrial equipment from a remote data source, and execute a rendering job based on the first user selection and the second user selection to generate a rendering of the industrial equipment. The systems may further be configured to generate a graphical representation of a plurality of selectable rendering options based on a 3D model of industrial equipment, transmit the graphical representation to a user device for presentation, receive a user selection of one or more rendering options from the plurality of selectable rendering options, and execute a rendering job based on the 3D model and the user selection of the one or more rendering options to generate a rendering of the industrial equipment. According to an exemplary embodiment, the systems are further configured to receive a render request identifying a 3D model of industrial equipment to be rendered from a first remote data source, generate a virtual object request identifying a second remote data source comprising virtual object data associated with the 3D model to be rendered, receive the virtual object data in a first format from the second remote data source, generate a 3D model rendering based on the virtual object data, where the 3D model rendering is in a second format different than the first format, and transmit the 3D model rendering to the first remote data source for use in representing the industrial equipment in an interactive environment. The systems may further be configured to receive a render request identifying a three-dimensional (3D) model of the industrial equipment to be rendered from a metaverse platform, generate and communicate to the metaverse platform a virtual object request requesting virtual object data associated with the 3D model, receive from the metaverse platform, virtual object data in a first format from the metaverse platform, and generate and transmit a 3D model rendering to the metaverse platform for use in representing the industrial equipment in the interactive virtual environment within the metaverse platform, where the 3D model rendering is generated in a second format different than the first format.

Web Services System with Rendering Platform

Figure 1:
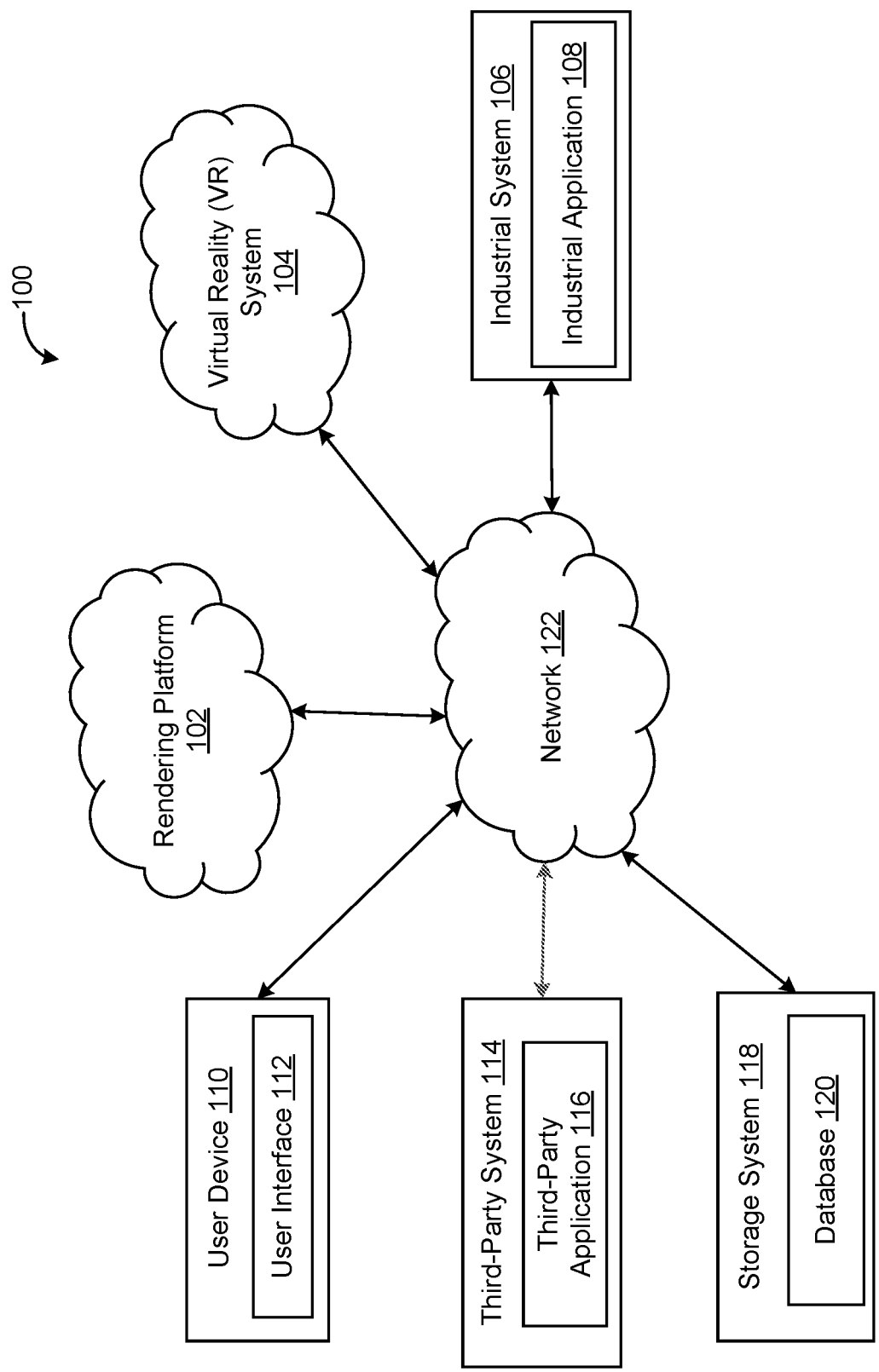
FIG. 1 is a block diagram of a web services system, according to some embodiments.

Referring generally to FIG. 1, a block diagram of a web services system 100 is shown, according to an exemplary embodiment. The web services system 100 is shown to include a Rendering as a Service (RaaS) platform, shown as rendering platform 102, a virtual reality (VR) system, shown as VR system 104, and an industrial system 106 having an industrial application 108. The web services system 100 may also include a user device 110 having a user interface 112, a third-party system 114 having a third-party application 116, and a storage system 118 having a database 120. The components of the web services system 100 may be connected, or in communication, via a network 122.

As will be discussed in greater detail below, the rendering platform 102 may be configured to receive a first user selection of a three-dimensional (3D) model of the industrial equipment and a second user selection of one or more rendering options, obtain (e.g., based on the first user selection) the 3D model of industrial equipment from a remote data source, and execute a rendering job based on the first user selection and the second user selection to generate a rendering of the industrial equipment. The rendering platform 102 may further be configured to generate a graphical representation of a plurality of selectable rendering options based on a 3D model of industrial equipment, transmit the graphical representation to a user device for presentation, receive a user selection of one or more rendering options from the plurality of selectable rendering options, and execute a rendering job based on the 3D model and the user selection of the one or more rendering options to generate a rendering of the industrial equipment. According to an exemplary embodiment, the rendering platform 102 is further configured to receive a render request identifying a 3D model of industrial equipment to be rendered from a first remote data source, generate a virtual object request identifying a second remote data source comprising virtual object data associated with the 3D model to be rendered, receive the virtual object data in a first format from the second remote data source, generate a 3D model rendering based on the virtual object data, where the 3D model rendering is in a second format different than the first format, and transmit the 3D model rendering to the first remote data source for use in representing the industrial equipment in an interactive environment. The rendering platform 102 may further be configured to receive a render request identifying a three-dimensional (3D) model of the industrial equipment to be rendered from a metaverse platform, generate and communicate to the metaverse platform a virtual object request requesting virtual object data associated with the 3D model, receive from the metaverse platform, virtual object data in a first format from the metaverse platform, and generate and transmit a 3D model rendering to the metaverse platform for use in representing the industrial equipment in the interactive virtual environment within the metaverse platform, where the 3D model rendering is generated in a second format different than the first format.

According to an exemplary embodiment, the rendering platform 102 is configured to communicate with components of the web services system 100. For example, the rendering platform 102 may communicate with the VR system 104, the industrial system 106, and/or the user device 110 via the network 122. Further, the rendering platform 102 may be configured to communicate with the third-party system 114 and/or the storage system 118 via the network 122.

As shown, the rendering platform 102 is configured to communicate with the VR system 104. According to an exemplary embodiment, the VR system 104 is a computing platform that provides digital connections between different computing devices and/or systems. For example, the VR system 104 may be configured to provide digital connections between a plurality of metadata sources, where the metadata sources are integrated within the VR system 104. The VR system 104 may be implemented on one or more processing circuits (e.g., as instructions stored on one or more memory devices and executed on one or more processors). In some embodiments, the VR system includes one or more artificial intelligence (AI) agents and/or one or more mapping or data schemes. According to an exemplary embodiment, the VR system 104 is configured to generate and/or present three-dimensional (or in some instances two-dimensional) virtual objects in a virtual environment. For example, the VR system 104 may provide a virtual representation of a piece of industrial equipment (e.g., manufacturing equipment, an assembly line, processing or refining equipment, etc.) in an industrial environment (e.g., automotive manufacturing facility, a food or preservative processing facility, a resource harvesting site or environment, etc.). In other embodiments, the VR system 104 provides a virtual representation of another suitable environment, for example a virtual campus, a virtual city, a metaverse environment, etc.

As show, the rendering platform 102 is also configured to communicate with the industrial system 106. According to an exemplary embodiment, the industrial system 106 is an industrial automation system having one or more pieces of industrial equipment. For example, the industrial system 106 may be a manufacturing facility having a piece of manufacturing equipment within an assembly line. In some embodiments, the industrial system 106 is an automotive manufacturing facility, a food processing facility, or a resource harvesting facility. The industrial system 106 is also shown to have the industrial application 108. In an exemplary embodiment, the industrial application 108 is configured to communicate with the rendering platform 102 (e.g., via the network 122), for example to provide a request or inputs and/or receive a job or rendering, as will be discussed below.

As shown, the rendering platform 102 is also configured to communicate with the user device 110. The user device 110 may include one or more human-machine interfaces or client interfaces, shown as user interface 112 (e.g., a graphical user interface, reporting interface, text-based computer interface, client-facing web service, web servers that provide pages to a web client, etc.) for controlling, viewing, and/or otherwise interfacing with the rendering platform 102. The user device 110 may be a computer workstation, a client terminal, a remote or local interface, and/or any other type of user interface device. The user device 110 may also be a stationary terminal, or a mobile device. For example, the user device 110 may be a desktop computer, a computer service with a user interface, a laptop computer, a tablet, a smartphone, a PDA, and/or any other type of mobile or non-mobile device.

As shown, the rendering platform 102 is also configured to communicate with the third-party system 114. In some embodiments, the third-party system 114 is a building or a building management system. For example, the third-party system 114 may be one or more systems associated with a building, such as an electrical system, an information communication technology (ICT) system, a security system, a heating or air conditioning system, a lighting system, a transportation system, a fire safety system, and/or another system associated with the functioning of a building. In some embodiments, the third-party system 114 connects one or more devices (e.g., building devices, pieces of building equipment, third-party devices, etc.), for example as a network, platform, and/or community of devices. The third-party system 114 is also shown to have the third-party application 116. In an exemplary embodiment, the third-party application 116 is configured to communicate with the rendering platform 102 (e.g., via the network 122), for example to provide a request or inputs and/or receive a job or rendering, as will be discussed below.

As shown, the rendering platform 102 is also configured to communicate with the storage system 118 (e.g., having the database 120). In an exemplary embodiment, the rendering platform 102 communicates with the storage system 118, either directly (e.g., via the network 122) or indirectly (e.g., via the user device 110, the VR system 104, etc.). The storage system 118 may include one or more devices (e.g., RAM, ROM, Flash memory, hard disk storage, etc.) for storing data and/or computer code for completing and/or facilitating the various processes, layers, and modules described herein. The storage system 118 may be or include volatile memory or non-volatile memory, and may include database components, object code components, script components, and/or any other type of information structure for supporting the various activities and information structures described herein According to an exemplary embodiment, and as will be discussed in greater detail below, the rendering platform 102 is also configured to generate data. For example, the rendering platform 102 may include components (e.g., a render request module 252, a jobs queue module 254, a jobs management module 256, a task management module 258, a virtual object module 260, a conversion module 262, a rendering database 264, etc.) that obtain, analyze, process, generate, store, and/or communicate data. In an exemplary embodiment, the rendering platform 102 is configured to generate a rendering of a piece of equipment (e.g., industrial equipment). The data generated by the rendering platform 102 may be analyzed, processed, stored, manipulated, etc. along with the data received from the other data sources discussed above. Further, the rendering platform 102 may communicate the data generated by the rendering platform 102, for example to initiate an automated action by one or more components of the web services system 100 (e.g., provide instructions to the user device 110, populate an interface within the industrial application 108, generate a virtual representation or object within the VR system 104, provide data to store in the storage system 118 for subsequent analysis, etc.).

Rendering Platform

Figure 2:
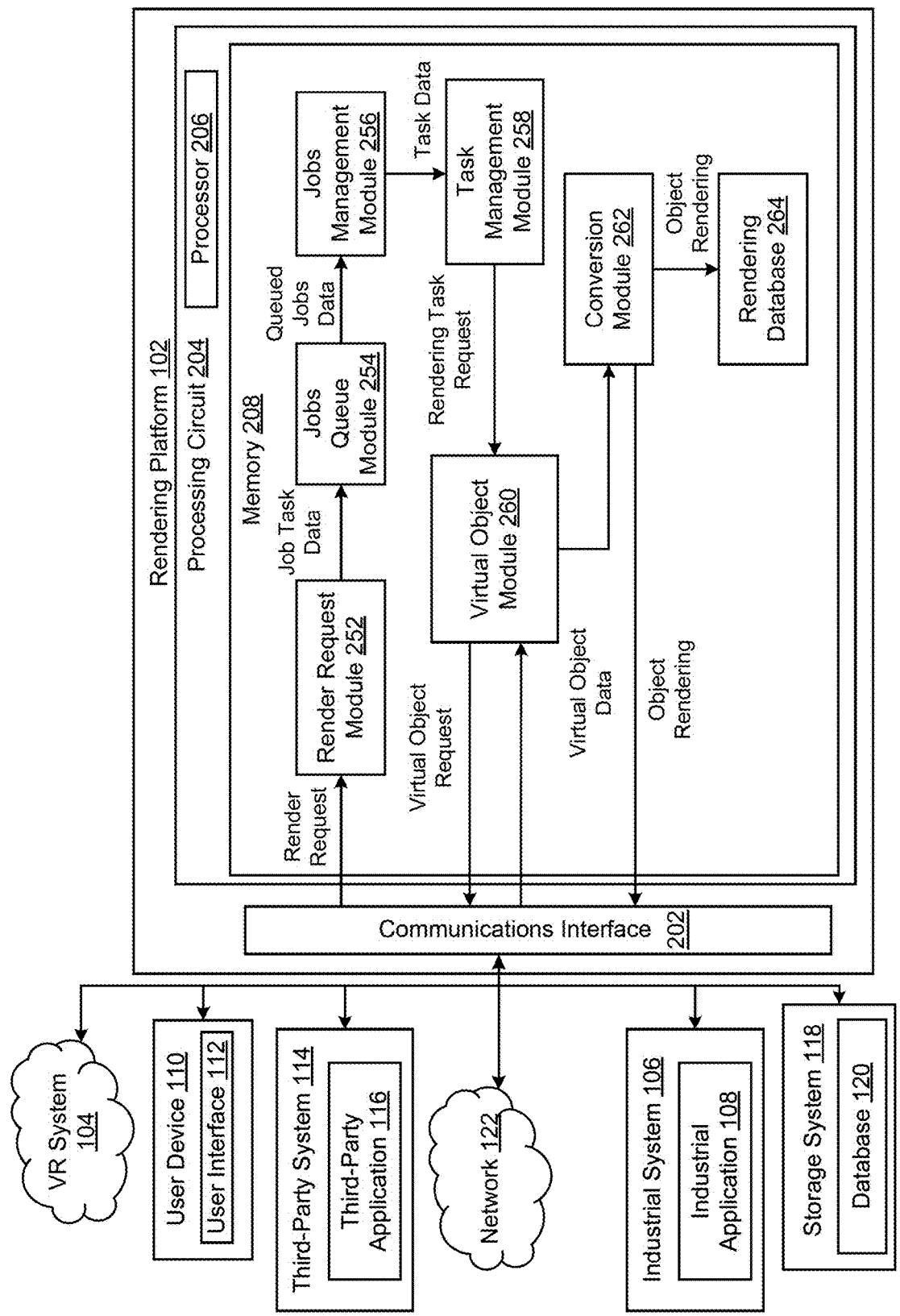
FIG. 2 is a block diagram a rendering platform, according to some embodiments.

Referring now to FIG. 2, a block diagram illustrating the rendering platform 102 in greater detail is shown, according to an exemplary embodiment. As discussed above, the rendering platform 102 may be configured to generate and/or provide a rendering of industrial equipment. For example, the rendering platform 102 may be configured to receive a first user selection of a three-dimensional (3D) model of the industrial equipment and a second user selection of one or more rendering options, obtain (e.g., based on the first user selection) the 3D model of industrial equipment from a remote data source, and execute a rendering job based on the first user selection and the second user selection to generate a rendering of the industrial equipment. The rendering platform 102 may further be configured to generate a graphical representation of a plurality of selectable rendering options based on a 3D model of industrial equipment, transmit the graphical representation to a user device for presentation, receive a user selection of one or more rendering options from the plurality of selectable rendering options, and execute a rendering job based on the 3D model and the user selection of the one or more rendering options to generate a rendering of the industrial equipment. According to an exemplary embodiment, the rendering platform 102 is further configured to receive a render request identifying a 3D model of industrial equipment to be rendered from a first remote data source, generate a virtual object request identifying a second remote data source comprising virtual object data associated with the 3D model to be rendered, receive the virtual object data in a first format from the second remote data source, generate a 3D model rendering based on the virtual object data, where the 3D model rendering is in a second format different than the first format, and transmit the 3D model rendering to the first remote data source for use in representing the industrial equipment in an interactive environment. The rendering platform 102 may further be configured to receive a render request identifying a three-dimensional (3D) model of the industrial equipment to be rendered from a metaverse platform, generate and communicate to the metaverse platform a virtual object request requesting virtual object data associated with the 3D model, receive from the metaverse platform, virtual object data in a first format from the metaverse platform, and generate and transmit a 3D model rendering to the metaverse platform for use in representing the industrial equipment in the interactive virtual environment within the metaverse platform, where the 3D model rendering is generated in a second format different than the first format.

As shown in FIG. 2, the rendering platform 102 is communicably connected to the VR system 104, the industrial system 106, the user device 110, the third-party system 114, and the storage system 118 (e.g., via the network 122). In some embodiments, the rendering platform 102 is communicably connected to other suitable systems and/or devices (e.g., via the network 122). It should be understood that some or all of the components of the rendering platform 102, the VR system 104, the industrial system 106, the user device 110, the third-party system 114, the storage system 118, the network 122, etc. may be implemented as part of a cloud-based computing system configured to obtain, process, and/or communicate data from one or more external devices or sources. Similarly, some or all of the components of the rendering platform 102, the VR system 104, the industrial system 106, the user device 110, the third-party system 114, the storage system 118, the network 122, etc. may be integrated within a single device, or be distributed across multiple separate systems or devices. In some embodiments, the rendering platform 102, the VR system 104, the industrial system 106, the user device 110, the third-party system 114, the storage system 118, the network 122, etc. are components of a controller, a device controller, a field controller, a computer workstation, a client device, and/or another system or device that receives, processes, and/or communicates data from/to devices or other data sources.

The rendering platform 102 is shown to include a communications interface 202 and a processing circuit 204 having a processor 206 and a memory 208. The communications interface 202 may include wired or wireless communications interfaces (e.g., jacks, antennas, transmitters, receivers, transceivers, wire terminals, etc.) for communicating data between the rendering platform 102 and external systems or devices (e.g., the VR system 104, the industrial system 106, the user device 110, the third-party system 114, the storage system 118, etc.). In some embodiments, the communications interface 202 facilitates communication between the rendering platform 102 and external applications (e.g., industrial application 108, third-party application 116), for example to allow a remote user or operator to control, monitor, and/or adjust components of the rendering platform 102. Further, the communications interface 202 may be configured to communicate with external systems and/or devices using any of a variety of communications protocols (e.g., HTTP(S), WebSocket, CoAP, MQTT, etc.), industrial control protocols (e.g., MTConnect, OPC, OPC-UA, etc.), process automation protocols (e.g., HART, Profibus, etc.), home automation protocols, and/or any of a variety of other protocols. Advantageously, the rendering platform 102 may obtain, ingest, and process data from any type of system or device, regardless of the communications protocol used by the system or device.

As shown in FIG. 2, the rendering platform 102 also includes the processing circuit 204 having the processor 206 and the memory 208. While shown as single components, it should be appreciated that the rendering platform 102 may include one or more processing circuits, including one or more processors and memory. In some embodiments, the rendering platform 102 includes a plurality of processors, memories, interfaces, and/or other components distributed across multiple devices or systems, that are communicably coupled via a network (e.g., the network 122). For example, in a cloud-based or distributed implementation, the rendering platform 102 may include multiple discrete computing devices, each of which include a processor 206, memory 208, communications interface 202, and/or other components of the rendering platform 102. Tasks performed by the rendering platform 102 may be distributed across multiple systems or devices, which may be located within a single building or facility, or distributed across multiple buildings or facilities. In other embodiments, the rendering platform 102 itself is implemented within a single computer (e.g., one server, one housing, etc.). All such implementations are contemplated herein.

The processor 206 may be a general purpose or specific purpose processor, an application specific integrated circuit (ASIC), one or more field programmable gate arrays (FP-GAs), a group of processing components, or other suitable processing components. The processor 206 may further be configured to execute computer code or instructions stored in the memory 208 or received from other computer readable media (e.g., CDROM, network storage, a remote server, etc.).

The memory 208 may include one or more devices (e.g., memory units, memory devices, storage devices, etc.) for storing data and/or computer code for completing and/or facilitating the various processes described in the present disclosure. The memory 208 may include random access memory (RAM), read-only memory (ROM), hard drive storage, temporary storage, non-volatile memory, flash memory, optical memory, or any other suitable memory for storing software objects and/or computer instructions. In some embodiments, the memory 208 includes database components, object code components, script components, and/or any other type of information structure for supporting the various activities and information structures described in the present disclosure. The memory 208 may be communicably connected to the processor 206 via the processing circuit 204, and may include computer code for executing (e.g., by the processor 206) one or more processes described herein. When the processor 206 executes instructions stored in the memory 208, the processor 206 may generally configure the processing circuit 204 to complete such activities.

Referring still to FIG. 2, the rendering platform 102 (e.g., the memory 208) is shown to include a render request module 252, a jobs queue module 254, a jobs management module 256, a task management module 258, a virtual object module 260, a conversion module 262, and a rendering database 264.

As discussed above, the rendering platform 102 (e.g., components 252-264) may be configured to generate and/or provide a rendering of industrial equipment. For example, the rendering platform 102 may be configured to receive a first user selection of a three-dimensional (3D) model of the industrial equipment and a second user selection of one or more rendering options, obtain (e.g., based on the first user selection) the 3D model of industrial equipment from a remote data source, and execute a rendering job based on the first user selection and the second user selection to generate a rendering of the industrial equipment. The rendering platform 102 may further be configured to generate a graphical representation of a plurality of selectable rendering options based on a 3D model of industrial equipment, transmit the graphical representation to a user device for presentation, receive a user selection of one or more rendering options from the plurality of selectable rendering options, and execute a rendering job based on the 3D model and the user selection of the one or more rendering options to generate a rendering of the industrial equipment. According to an exemplary embodiment, the rendering platform 102 is further configured to receive a render request identifying a 3D model of industrial equipment to be rendered from a first remote data source, generate a virtual object request identifying a second remote data source comprising virtual object data associated with the 3D model to be rendered, receive the virtual object data in a first format from the second remote data source, generate a 3D model rendering based on the virtual object data, where the 3D model rendering is in a second format different than the first format, and transmit the 3D model rendering to the first remote data source for use in representing the industrial equipment in an interactive environment. The rendering platform 102 may further be configured to receive a render request identifying a three-dimensional (3D) model of the industrial equipment to be rendered from a metaverse platform, generate and communicate to the metaverse platform a virtual object request requesting virtual object data associated with the 3D model, receive from the metaverse platform, virtual object data in a first format from the metaverse platform, and generate and transmit a 3D model rendering to the metaverse platform for use in representing the industrial equipment in the interactive virtual environment within the metaverse platform, where the 3D model rendering is generated in a second format different than the first format. The following paragraphs describe some of the general functions performed by each of the components 252-264 of the rendering platform 102.

In an exemplary embodiment, the render request module 252 is configured to obtain input data, analyze the input data, and generate output data to be communicated to other components of the rendering platform 102. For example, the render request module 252 may be configured to obtain (e.g., receive, request, pull, etc.) a render request. In an exemplary embodiment, the render request module 252 receives the render request from the user device 110, the industrial system 106, and/or the third-party system 114 (e.g., via the communications interface 202). For example, the render request module 252 may receive the render request from a virtual modeling application, a commissioning application, a storage application, and/or a local storage device associated with at least one of the user device 110, the industrial system 106, the third-party system 114, and/or the storage system 118. In other embodiments, the render request module 252 receives the render request from the VR system 104 (e.g., via the communications interface). The render request module 252 may receive the render request in response to an input (e.g., via a user interaction with an interface or application), or the render request may be received automatically (e.g., from the VR system 104, etc.) In other embodiments, the render request is received in response to an automated action or activity performed by the rendering platform 102 (e.g., in response to an output or initiation action communicated from the rendering platform 102 to the VR system 104, the user device 110, etc.). In other embodiments, the render request is received in response to an automated action or activity performed by the rendering platform 102 (e.g., in response to an output or initiation action communicated from the rendering platform 102, etc.).

According to an exemplary embodiment, the render request is received in a first data format. For example, the render request may be received in a .dwg, .dxf, .arc, or .dae file format. In some embodiments, the render request is made up of a plurality of request portions or segments, for example a first request segment, a second request segment, a third request segment, etc. In an exemplary embodiment, the request segments are associated with an identified object, characteristic, quality, and/or selection associated with a rendering to be generated, as discussed below. The plurality of request segments may be received simultaneously (e.g., as a single render request), sequentially, at predetermined intervals, and/or in another suitable scheme, design, or pattern.

According to an exemplary embodiment, the render request includes information (e.g., a characteristic, quality, selection, etc.) associated with a rendering to be provided or generated (e.g., by the rendering platform). For example, the render request may include an identification of an object to be rendered. In an exemplary embodiment, the render request includes an identification of a piece of industrial equipment to be rendered. For example, the render request may identify a three-dimensional model associated with the piece of industrial equipment to be rendered. In other embodiments, the render requests includes or identifies video (e.g., 3D animation, 3D video, 3D model, etc.) or image (e.g., 3D image, 2D image, etc.) of a piece of industrial equipment to be rendered. It should be understood that while the render request is described herein as identifying an object (e.g., piece of industrial equipment) to be rendered, in other embodiments the render request identifies an environment (e.g., an industrial manufacturing environment, etc.), a plurality of objects (e.g., a plurality of pieces of industrial equipment), and/or plurality of objects within an environment (e.g., a plurality of pieces of industrial equipment within an assembly line of a manufacturing facility, etc.) to be rendered.

According to an exemplary embodiment, the render request also includes information (e.g., a characteristic, quality, selection, etc.) associated with one or more characteristics of the rendering to be generated. For example, the render request may include or identify a dimension or view of the piece of industrial equipment to be rendered. In some embodiments, the render request includes or identifies a viewpoint (e.g., of a virtual camera capturing the identified object), a resolution, a ray tracing value, an aspect ratio selection, and/or other characteristics associated with the rendering to be generated (e.g., by the rendering platform 102). In some embodiments, the render request includes or identifies a light source to illuminate the object and/or a light source placement to be used when generating the object rendering. In other embodiments, the render request includes an identification of a path of movement of a virtual camera (e.g., in 3D space around the object) associated with the rendering to be generated, for example such that the rendering may be generated from the perspective of the virtual camera and/or the virtual camera may move along the path (e.g., in 3D space, around or through components of the object, etc.) in the rendering to be generated. In an exemplary embodiment, the render request module 252 is further configured to analyze the render request and convert the render request into one or more job tasks (e.g., job task data). The render request module 252 may communicate the render request and/or the job task data to one or more components of the rendering platform 102 (e.g., the jobs queue module 254), for example for further analysis and processing.

In an exemplary embodiment, the jobs queue module 254 is configured to obtain job task data, analyze the data, and/or queue job tasks. In an exemplary embodiment, the jobs queue module 254 obtains (e.g., receives, requests, pulls, etc.) job task data from the render request module 252. The job task data may include one or more job tasks associated with the render request. For example, the job task data may include a first job task associated with the object (e.g., the piece of industrial equipment) to be rendered, a second job task associated with a view of the object (e.g., perspective view, etc.) to be rendered, a third job task associated with a resolution of the object to be rendered, etc. In some embodiments, the job tasks include one or more calls or requests, for example for data (e.g., virtual models, videos, animations, images, etc.) associated with the object and/or characteristic of the object to be rendered.

According to an exemplary embodiment, the jobs queue module 254 is further configured to receive the job task data and analyze the job task data. For example, the jobs queue module 254 may analyze and/or process the job task data, and queue job tasks (e.g., in the form of queued jobs data, etc.). The queued jobs data may represent a series of job tasks, for example a series of job tasks that are to be completed in generating the rendering (e.g., the object to be rendered). In some embodiments, the queued jobs data is organized or arranged (e.g., via the jobs queue module 254) according to a mapping or data scheme. In other embodiments, the queued jobs data is organized or arranged according to a processing hierarchy (e.g., arranging jobs according to the processing or computing resources consumed in completing the job task), for example to reduce the computational resources consumed and/or increase efficiencies in completing job tasks by reducing redundant or incompatible job tasks. In other embodiments, the queued jobs data is organized or arranged according to a job completion timeline (e.g., arranging jobs according to an anticipated or projected timeline associated with completing the job task), for example to increase efficiencies in completing job tasks by ensuring proper job task order and/or job task completion time compatibility. According to an exemplary embodiment, the jobs queue module 254 communicates the queued jobs data to one or more components of the rendering platform (e.g., the jobs management module 256), for example for further processing and analysis.

In an exemplary embodiment, the jobs management module 256 is configured to obtain queued jobs data, analyze the data, and/or generate task data. In an exemplary embodiment, the jobs management module 256 obtains (e.g., receives, requests, pulls, etc.) queued jobs data from the jobs queue module 254. The jobs management module 256 may be configured to analyze and/or process the queued jobs data, and provide or generate one or more tasks (e.g., in the form of task data) associated with the queued jobs.

According to an exemplary embodiment, the task data includes one or more tasks associated with the render request, for example one or more calls or requests associated with the object and/or characteristics of the object to be rendered. In some embodiments, the jobs management module arranges or organizes queued job tasks (e.g., to form the task data). For example, the jobs management module 256 may be configured to group a series or sequence of queued job tasks in one or more batches. In some embodiments, the jobs management module 256 is configured to generate task data (e.g., one or more batches of job tasks, etc.), for example to reduce the computational resources consumed and/or increase efficiencies in completing tasks by reducing redundant or incompatible job tasks. The jobs management module 256 may also be configured to generate task data (e.g., one or more batches of job tasks, etc.), for example to increase efficiencies in completing tasks by ensuring proper task order, task compatibility, and/or task completion timeline. According to an exemplary embodiment, the jobs management module 256 is configured to communicate the task data to one or more components of the rendering platform (e.g., the task management module 258), for example for further processing and analysis.

In an exemplary embodiment, the task management module 258 is configured to obtain task data, analyze the data, and/or generate a rendering task request. In an exemplary embodiment, the task management module 258 obtains (e.g., receives, requests, pulls, etc.) task data from the jobs management module 256. The task management module 258 may be configured to analyze and/or process the task data, and provide or generate a rendering task request associated with the tasks.

According to an exemplary embodiment, the rendering task request includes one or more calls or requests associated with the object and/or characteristics of the object to be rendered. In some embodiments, the task management module 258 arranges or organizes tasks (e.g., to form the rendering task request). For example, the task management module 258 may be configured to group a series or sequence of tasks in one or more batches. In some embodiments, the task management module 258 is configured to generate a rendering task request (e.g., one or more batches of tasks, etc.), for example to reduce the computational resources consumed and/or increase efficiencies in completing tasks associated with generating a rendering. The task management module 258 may also be configured to generate a rendering task request that increased efficiencies in completing the tasks, for example by ensuring proper batch order, batch compatibility, and/or batch completion timeline. According to an exemplary embodiment, the task management module 258 is configured to communicate the rendering task request to one or more components of the rendering platform (e.g., the virtual object module 260), for example for further processing an analysis.

In an exemplary embodiment, the virtual object module 260 is configured to obtain a rendering task request, analyze the task request, and/or generate a virtual object request. In an exemplary embodiment, the virtual object module 260 obtains (e.g., receives, requests, pulls, etc.) the rendering task request from the task management module 258. The virtual object module 260 may be configured to analyze and/or process the rendering task request, and provide or generate a virtual object request. For example, the virtual object module 260 may analyze the rendering task request, and identify (e.g., determine, etc.) a device, system, or environment where virtual object data (e.g., associated with the rendering task request) exists.

According to an exemplary embodiment, the virtual object request includes an identifier associated with the identified object. For example, the virtual object request may include an object identifier, which is associated with the three-dimensional model associated with the piece of building equipment to be rendered. In some embodiments, the virtual object request includes a supplier identifier, which may be associated with the device, system, or environment where the virtual object data exists. In other embodiments, the virtual object request includes an object type identifier, which may be associated with a data format and/or type of the object (e.g., 3D model, video, animation, image, etc.) associated with the request.

According to an exemplary embodiment, the virtual object module 260 is configured to communicate the virtual object request to a device, system, or environment. For example, the virtual object module 260 may be configured to communicate the virtual object request to the VR system 104, the industrial system 106, the user device 110, the third-party system 114, and/or the storage system 118 (e.g., via the communications interface 202, over the network 122, etc.). In an exemplary embodiment, the virtual object module 260 is configured to communicate the virtual object request to an application (e.g., a virtual modeling application, a commissioning application, a storage application, etc.), for example an application associated with the VR system 104, the industrial system 106, the user device 110, etc. In some embodiments, the virtual object module 260 is configured to communicate the virtual object request to one or more artificial intelligence or cloud-based computing systems. For example, the virtual object module 260 may be configured to communicate the virtual object request to a virtual modeling platform, a virtual machine scale set platform, a virtual modeling platform, for example hosted within the VR system 104. In other embodiments, the virtual object module 260 is configured to communicate the virtual object request to one or more artificial intelligence or cloud-based computing systems operating within the industrial system 106 or the third-party system 114, on the user device 110, and/or within the storage system 118.

In an exemplary embodiment, the virtual object module 260 is configured to receive virtual object data. For example, based on and/or in response to the virtual object request, the virtual object module 260 may be configured to receive virtual object data from the associated device, system, or environment (e.g., the VR system 104, the industrial system 106, the user device 110, the third-party system 114, and/or the storage system 118). In an exemplary embodiment, the virtual object data comprises object data associated with the object to be rendered (e.g., associated with the render request, etc.). For example, the virtual object data may include the three-dimensional model associated with the piece of industrial equipment to be rendered. In some embodiments, the virtual object data comprises object data associated with the one or more identified characteristics associated with the object to be rendered (e.g., model views, model dimensions, model resolution, video views, video resolution, image viewpoints, etc.). In some embodiments, the virtual object data is received in a first format (e.g., a .dwg, .dxf, .arc, .dae, etc. file format). In some embodiments, the virtual object data is configured to be modified (e.g., changed, updated, altered, manipulated, etc.). For example, the virtual object data may include a three-dimensional model (e.g., associated with a piece of industrial equipment), which may be modified (e.g., changed, updated, etc.). In response to modifications to the virtual object data, the virtual object module 260 may be configured to automatically receive the modified virtual object data (e.g., in real-time, etc.).

According to an exemplary embodiment, the virtual object module 260 is further configured to communicate the virtual object data to one or more components of the rendering platform 102. For example, the virtual object module 260 may be configured to communicate the virtual object data to the conversion module 262 (e.g., for further analysis and/or processing). In some embodiments, the virtual object module 260 is configured to communicate the virtual object data to the rendering database 264, for example for storage and/or subsequent rendering generation and/or processing.

In an exemplary embodiment, the conversion module 262 is configured to obtain virtual object data, analyze and/or process the data, and generate an object rendering. For example, the conversion module 262 may be configured to obtain (e.g., receive, request, pull, etc.) virtual object data from the virtual object module 260. In some embodiments, the conversion module 262 obtains virtual object data (e.g., via the communications interface 202 over the network 122, etc.) from the associated device, system, or environment (e.g., the VR system 104, the industrial system 106, the user device 110, the third-party system 114, and/or the storage system 118). As discussed above, in other embodiments the conversion module 262 is configured to obtain (e.g., receive, request, pull, etc.) modified virtual object data (e.g., in response to post-design modifications). The conversion module 262 may further be configured to automatically generate a modified object rendering (e.g., based on the modified virtual object data), as will be discussed below.

As noted above, according to an exemplary embodiment, the conversion module 262 is configured to receive the virtual object data, analyze the object data, and generate an object rendering. For example, the conversion module 262 may receive the virtual object data in a first format (e.g., e.g., a .dwg, .dxf, .arc, .dae, etc. file format), analyze or convert the virtual object data, and generate an object rendering in a second format. According to an exemplary embodiment, the first format and the second format are different. For example, first format may be a .dwg, .dxf, .arc, or dae, file format, and the second format may be a universal scene description (USD) format. In some embodiments, the conversion module 262 is configured to generate an object rendering based on one or more conversion constraints (e.g., cost of generating the rendering, efficiency or time, computational resources consumed, etc.). For example, the conversion module 262 may be configured to generate an object rendering (e.g., in a specific file format, etc.) to increase cost effectiveness. In an exemplary embodiment, the object rendering is a rendering of the identified object to be rendered (e.g., associated with the render request). For example, the object rendering may be a rendering of a piece of building equipment, in a selected format (e.g., a 3D model, etc.) having selected characteristics (e.g., from a selected point of view, having a selected resolution, having selected dimensions, etc.).

According to an exemplary embodiment, the conversion module 262 is further configured to communicate the object rendering to one or more devices, systems, or environments. In an exemplary embodiment, the conversion module 262 is configured to communicate the object rendering to the VR system 104, the industrial system 106, the user device 110, the third-party system 114, and/or the storage system 118 (e.g., via the communications interface 202 via the network 122). For example, the conversion module 262 may be configured to communicate the object rendering to the VR system 104 (e.g., a metaverse platform within the VR system 104, etc.) for use in representing the object (e.g., industrial equipment) in an interactive virtual environment. In other embodiments, the conversion module 262 is configured to communicate the object rendering to the industrial system 106 (e.g., the industrial application 108, etc.) and/or the user device 110 (e.g., the user interface 112), for example for display on the industrial application 108 and/or the user interface 112. In some embodiments, the object rendering is communicated to an application (e.g., a virtual modeling application, a commissioning application, a storage application, etc.) associated with the industrial system 106, the user device 110, and/or the third-party system 114, for example for use in an interactive environment associated with the application. In other embodiments, the conversion module 262 is configured to communicate the object rendering to the storage system 118 (e.g., the database 120), for example for storage and/or subsequent rendering generation and/or processing. In yet other embodiments, the conversion module 262 is configured to communicate the object rendering to one or more components of the rendering platform 102. For example, the conversion module 262 may be configured to communicate the object rendering to the rendering database 264, for example for storage and/or subsequent rendering generation and/or processing.

Figure 3:
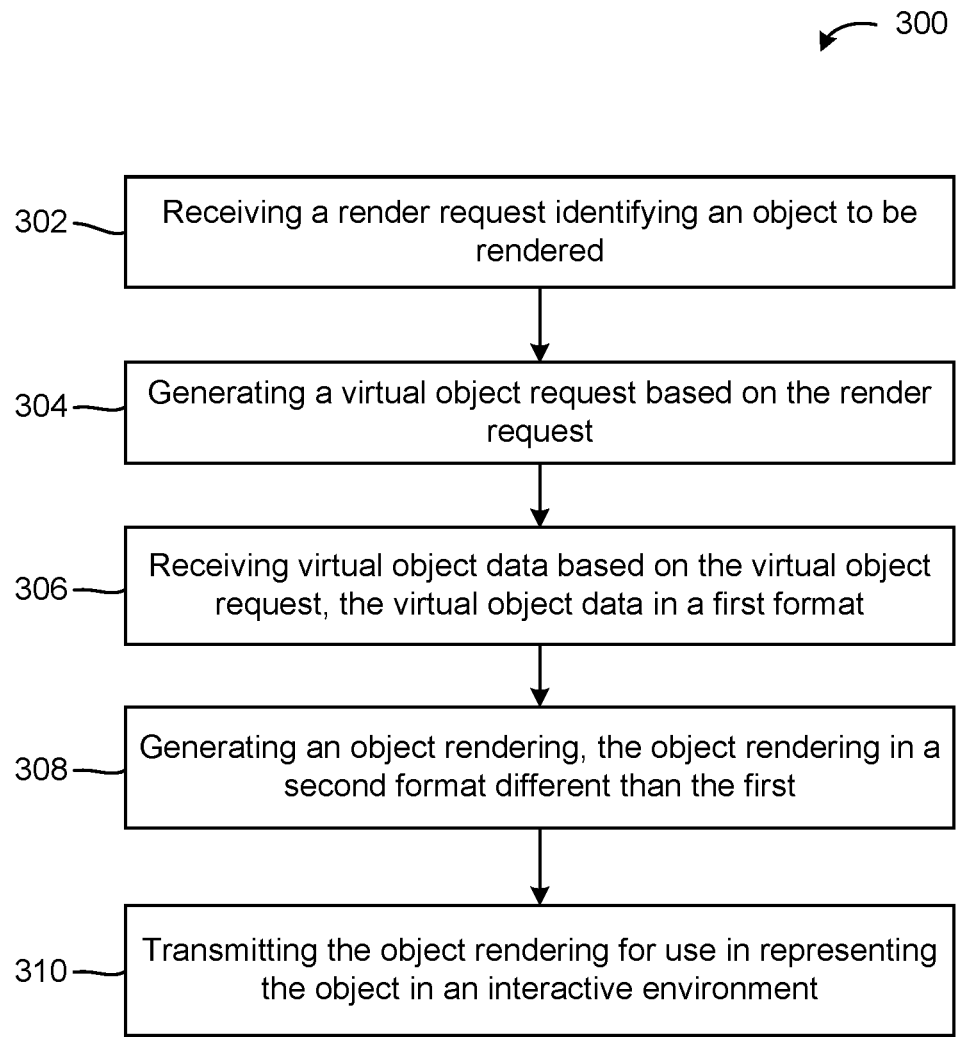
FIG. 3 is a flow diagram of a process of generating a rendering of industrial equipment, according to some embodiments.

Referring now to FIG. 3, a process 300 for providing and/or generating a rendering of an object (e.g., a 3D model of industrial equipment, etc.) is shown, according to an exemplary embodiment. Process 300 may be implemented by any and/or all of the components of the web services system 100 of FIGS. 1-2 (e.g., the rendering platform 102, etc.). It should be appreciated that any and/or all of the process 300 may be implemented by other systems, devices, and/or components (e.g., components of the web services system 100, the rendering platform 102, etc.). It should also be appreciated that in some embodiments, process 300 may be implemented using additional, different, and/or fewer steps.

Process 300 is shown to include receiving a render request identifying an object to be rendered (step 302), according to an exemplary embodiment. In an exemplary embodiment, identifying the object identifies a three-dimensional model of industrial equipment to be rendered. The render request may be received from a first remote data source. The first remote data source may be the user device 110 (e.g., via the user interface 112), the VR system 104, the industrial system 106 (e.g., via the industrial application 108), the storage system 118, and/or another suitable remote data source.

In some embodiments, the render request identifies a video, an image, an animation, or another suitable visual representation (e.g., of industrial equipment, of an industrial environment, etc.) to be rendered. The render request may also include a perspective or viewpoint of a virtual camera from which to view the 3D model when generating the object rendering. In some embodiments, the render request includes an identification of a light source used to illuminate the 3D model when generating the object rendering, and/or a light source placement used when generating the object rendering. In other embodiments, the render request includes an identification of a movement path of a virtual camera in a 3D space around or through components of the 3D model. For example, when generating the object rendering the rendering may be from the perspective of the virtual camera, and/or may be from the perspective of the virtual camera as it moves along a movement path. In yet other embodiments, the render request identifies a resolution, a ray tracing value, an aspect ratio, and/or other suitable characteristic or quality associated with generating the object rendering.

Process 300 is shown to include generating a virtual object request based on the render request (step 304), according to an exemplary embodiment. In an exemplary embodiment, the virtual object request identifies a second remote data source. The second remote data source may comprise virtual object data associated with the object to be rendered (e.g., the 3D model to be rendered). In some embodiments, the first remote data source and the second remote data source are different. For example, the first remote data source may be the user device 110 (and/or the user interface 112), and the second remote data source may be a metaverse platform (e.g., of the VR system 104). In some embodiments, the first remote data source and the second remote data source are components or devices of the same device or system. For example, the first remote data source may be the user interface 112 of the user device 110, and the second remote data source may be a storage or memory device of the user device 110. In other embodiments, the first remote data source and/or the second remote data source are an application (e.g., a virtual modeling application, a commissioning application, a storage application, etc.), and/or another component or device, associated with at least one of the VR system 104 (e.g., a metaverse platform of the VR system 104, etc.), the industrial system 106 (e.g., the industrial application 108), the user device 110

(e.g., the user interface 112), the third-party system 114 (e.g., the third-party application 116), and/or the storage system 118 (e.g., the database 120).

In some embodiments, the process 300 also includes generating a plurality of job tasks based on the render request. The job tasks may be individual or discrete jobs associated with generating the object rendering (e.g., the 3D model rendering). For example, the job tasks may include one or more calls or requests for data sets or data packages (e.g., associated with the 3D model). In some embodiments, the process 300 includes generating a jobs task queue, for example by ordering the plurality of job tasks. In other embodiments, the process 300 also includes generating task data (e.g., based on the jobs task queue, etc.), where the task data includes a batch of job tasks selected from the plurality of job tasks of the jobs task queue. In yet other embodiments, the process 300 includes generating a rendering task request (e.g., based on the task data), where the rendering task request includes a batch of tasks selected from a plurality of tasks associated with generating the object rendering (e.g., the 3D model rendering). According to an exemplary embodiment, any or all of the steps of generating job tasks, generating a jobs task queue, generating task data, and/or generating a rendering task request may be completed according to a mapping or data scheme, a hierarchy, a completion timeline, or another suitable scheme, for example to reduce the computational resources consumption and/or increase efficiencies in completing the jobs and tasks associated with generating the object rendering (e.g., 3D model rendering).

Process 300 is shown to include receiving virtual object data based on the virtual object request (step 306), according to an exemplary embodiment. According to an exemplary embodiment, the virtual object data is received from the second remote data source. In an exemplary embodiment, the virtual object data is received in a first format. For example, the virtual object data may be received in a 3D virtual model data format (e.g., a dwg, .dxf, .arc, or .dae, etc. file format). In other embodiments, the virtual object data is received in another suitable image, video, animation, and/or model data format.

Process 300 is shown to include generating an object rendering based on the virtual object data (step 308), according to an exemplary embodiment. In an exemplary embodiment, generating the object rendering includes generating the 3D model rendering (e.g., of the industrial equipment). The object rendering (e.g., 3D model rendering) may be in a second format. According to an exemplary embodiment, the second format is different than the first format. For example, the second format may be a universal scene description (USD) file format, whereas the first format is a (e.g., different) 3D virtual model data format. In other embodiments, the second format is an image or video file format, and the first format is another (e.g., different) suitable image, video, model, and/or animation file format.

Process 300 is shown to include transmitting the object rendering for use in representing the object in an interactive environment (step 310), according to an exemplary embodiment. In an exemplary embodiment, transmitting the object rendering includes transmitting the 3D model rendering. The object rendering (e.g., 3D model rendering) may be transmitted to a remote data source, for example the first remote data source. As discussed above, in an exemplary embodiment the first remote data source and the second remote data source are different (e.g., the first remote data source is a virtual modeling application, and the second remote data source is a metaverse platform). In other embodiments, the first remote data source and the second remote data source are components and/or features of the same device or system (e.g., the VR system 104, the user device 110, the industrial system 106, etc.).

According to an exemplary embodiment, the process 300 includes transmitting the object rendering to the first remote data source, for example for use, display, and/or manipulation within an application or platform associated with the first remote data source. For example, the object rendering (e.g., 3D model rendering) may be transmitted to the VR system 104 (e.g., a metaverse platform within the VR system 104, etc.) for use in representing the object (e.g., industrial equipment) in an interactive virtual environment. In other embodiments, the object rendering (e.g., 3D model rendering) is transmitted to an application (e.g., a virtual modeling application, a commissioning application, a storage application, etc.) associated with the industrial system 106, the user device 110, and/or the third-party system 114, for example for use in an interactive environment associated with the application. In yet other embodiments, the object rendering (e.g., 3D model rendering) is transmitted to the storage system 118 (e.g., the database 120), for example for storage and/or subsequent rendering generation and/or processing. In other embodiments, the object rendering is transmitted to the second remote data source, and/or another suitable device or component of the web services system 100. In an exemplary embodiment, the object rendering (e.g., 3D model rendering) is transmitted to any suitable combination (or all) of the components described herein (e.g., components of the web services system 100).

Figure 4:
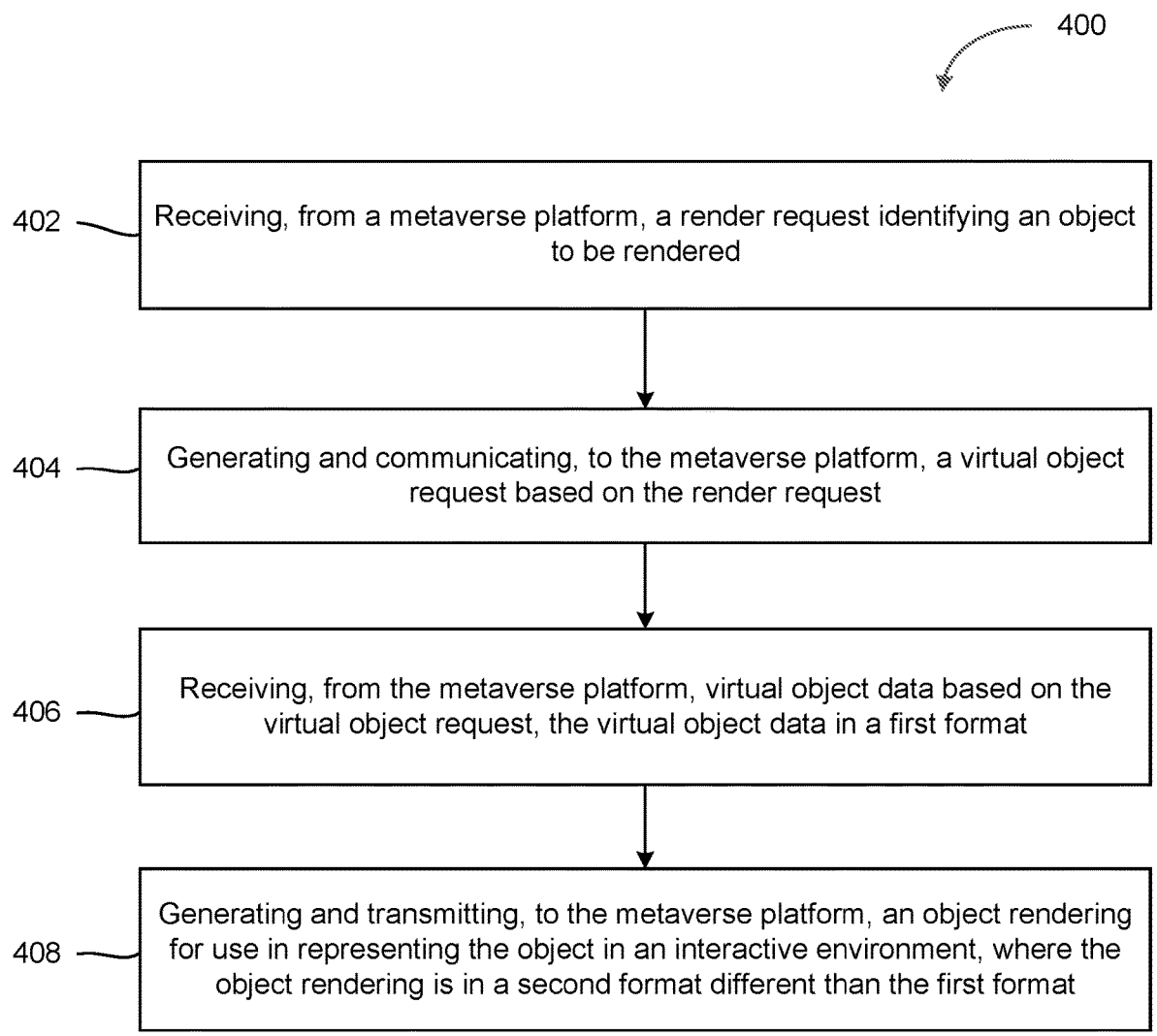
FIG. 4 is a flow diagram of a process of generating a rendering of industrial equipment for use in an interactive virtual environment within a metaverse platform, according to some embodiments.

Referring now to FIG. 4, a process 400 for providing and/or generating a rendering of an object (e.g., a 3D model of industrial equipment) for use in an interactive virtual environment (e.g., within a metaverse platform) is shown, according to an exemplary embodiment. Process 400 may be implemented by any and/or all of the components of the web services system 100 of FIGS. 1-2 (e.g., the rendering platform 102, etc.). It should be appreciated that any and/or all of the process 400 may be implemented by other systems, devices, and/or components (e.g., components of the web services system 100, the rendering platform 102, the VR system 104, etc.). It should also be appreciated that in some embodiments, process 400 may be implemented using additional, different, and/or fewer steps.

Process 400 is shown to include receiving a render request identifying an object to be rendered (step 402), according to an exemplary embodiment. In an exemplary embodiment, the render request is received from a metaverse platform, for example a metaverse platform associated with the VR system 104. In some embodiments, the render request is received from a metaverse platform associated with the industrial system 106, the third-party system 114, and/or another suitable system. In an exemplary embodiment, the render request identifies a three-dimensional model of industrial equipment to be rendered. In some embodiments, the render request is an automated render request, such that the render request is automatically generated via the metaverse platform (e.g., via one or more AI agents, etc.).

As noted above, the render request may identify a video, an image, an animation, or another suitable visual representation (e.g., of industrial equipment, of an industrial environment, etc.) to be rendered. The render request may also include a perspective or viewpoint of a virtual camera from which to view the 3D model when generating the object rendering, an identification of a light source used to illuminate the 3D model when generating the object rendering, and/or a light source placement used when generating the object rendering. The render request may also include an identification of a movement path of a virtual camera in a 3D space around or through components of the 3D model. For example, when generating the object rendering the rendering may be from the perspective of the virtual camera, and/or may be from the perspective of the virtual camera as it moves along a movement path. The render request may further identify a resolution, a ray tracing value, an aspect ratio, and/or other suitable characteristic or quality associated with generating the object rendering.

Process 400 is shown to include generating and communicating a virtual object request based on the render request (step 404), according to an exemplary embodiment. In an exemplary embodiment, the render request is communicated to the metaverse platform. The virtual object request may include a request for object data associated with the object to be rendered (e.g., the 3D model to be rendered).

Process 400 is shown to include receiving virtual object data based on the virtual object request (step 406), according to an exemplary embodiment. In an exemplary embodiment, the virtual object data is received from the metaverse platform. In an exemplary embodiment, the virtual object data is received in a first format. For example, the virtual object data may be received in a 3D virtual model data format (e.g., a dwg, .dxf, .arc, or .dae, etc. file format). In other embodiments, the virtual object data is received in another suitable image, video, animation, and/or model data format.

Process 400 is shown to include generating and transmitting an object rendering for use in representing the object in an interactive environment (step 408), according to an exemplary embodiment. In an exemplary embodiment, the object rendering is transmitted to the metaverse platform. The object rendering may be a rendering of the 3D model (e.g., a 3D model rendering of the industrial equipment), which may be generated, for example, based on the virtual object data. According to an exemplary embodiment, the object rendering (e.g., 3D model rendering) is in a second format. The second format may be different than the first format. For example, the second format may be a universal scene description (USD) file format, whereas the first format is a (e.g., different) 3D virtual model data format. In some embodiments, the second format is an image or video file format, and the first format is another (e.g., different) suitable image, video, model, and/or animation file format.

According to an exemplary embodiment, process 400 includes transmitting the object rendering (e.g., 3D model rendering of the industrial equipment) for use in representing the object in an interactive virtual environment within the metaverse platform. For example, the object rendering (e.g., 3D model rendering) may be transmitted to the VR system 104 for use in representing, populating, and/or manipulating an interactive virtual environment within the metaverse platform. In this regard, process 400 may be used to generate and/or transmit renderings to a metaverse platform, for example to populate, manipulate, or represent an interactive virtual environment within the metaverse platform.

Referring generally to FIGS. 5-13, a series of interfaces for preparing and/or displaying a rendering of an object (e.g., a 3D model of industrial equipment, etc.) are shown, according to exemplary embodiments. The various interfaces of FIGS. 5-13 may be generated and/or displayed via any and/or all of the components of the web services system 100 of FIGS. 1-3. For example, the interfaces of FIGS. 5-13 may be generated and/or provided by the rendering platform 102 of FIGS. 1-3. Further, the interfaces of FIGS. 5-13 may be displayed and/or presented via an interfaces or display of the user device 110, the industrial system 106 (e.g., the industrial application 108), the third-party system 114 (e.g., the third-party application 116), and/or another suitable system or device. It should be appreciated that any and/or all of the interfaces of FIGS. 5-13 may be presented and/or displayed by other systems, devices, and/or components (e.g., components of the web services system 100, the VR system 104, etc.). It should also be appreciated that in some embodiments, interfaces of FIGS. 5-13 may be implemented with additional, fewer, and/or different components or features.

Figure 5:
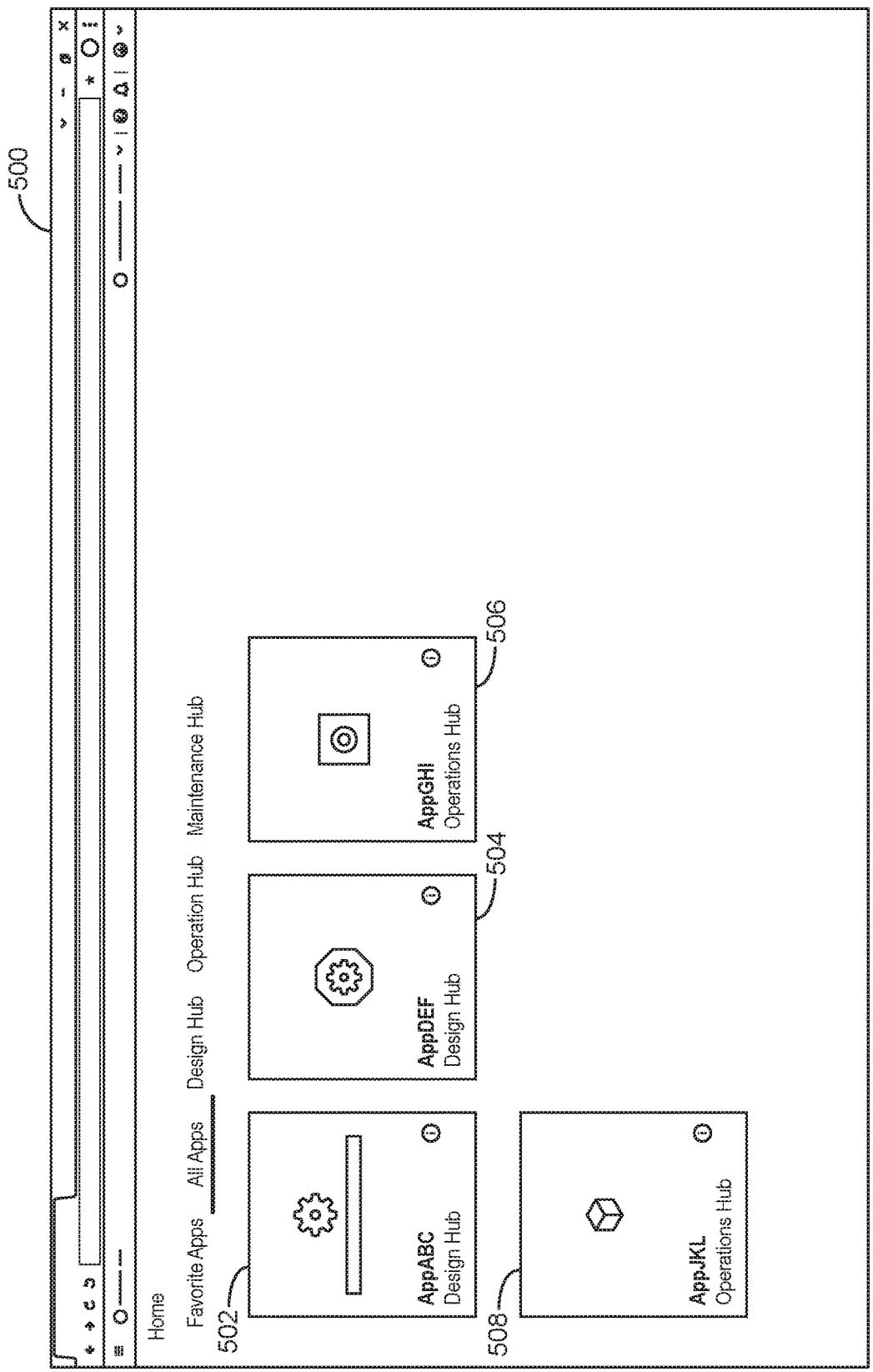
FIG. 5 is an interface displaying an application main menu, according to some embodiments.

Referring now to FIG. 5, an interface 500 is shown, according to an exemplary embodiment. In an exemplary embodiment, the interface 500 is an application main menu interface. As shown, the interface 500 includes a plurality of selectable icons. Each of the selectable icons may be associated with an application, service, and/or system platform.

As shown, the interface 500 includes a first application icon 502, a second application icon 504, a third application icon 506, and a fourth application icon 508. In an exemplary embodiment, the first application icon 502 is associated with a first virtual modeling application, the second application icon 504 is associated with a second virtual modeling application, and the third application icon 506 is associated with a commissioning application. According to an exemplary embodiment, the fourth application icon 508 is associated with a Rendering as a Service (RaaS) application and/or a connected RaaS platform (e.g., the rendering platform 102 of FIGS. 1-3). As noted above, each of the icons 502-508 are selectable, and in response to a selection of one of the icons 502-508 the operator may be directed to an interface associated with the related application. For example, in response to a selection of the fourth application icon 508, an operator may be directed to a RaaS application and/or an associated interface.

Figure 6:
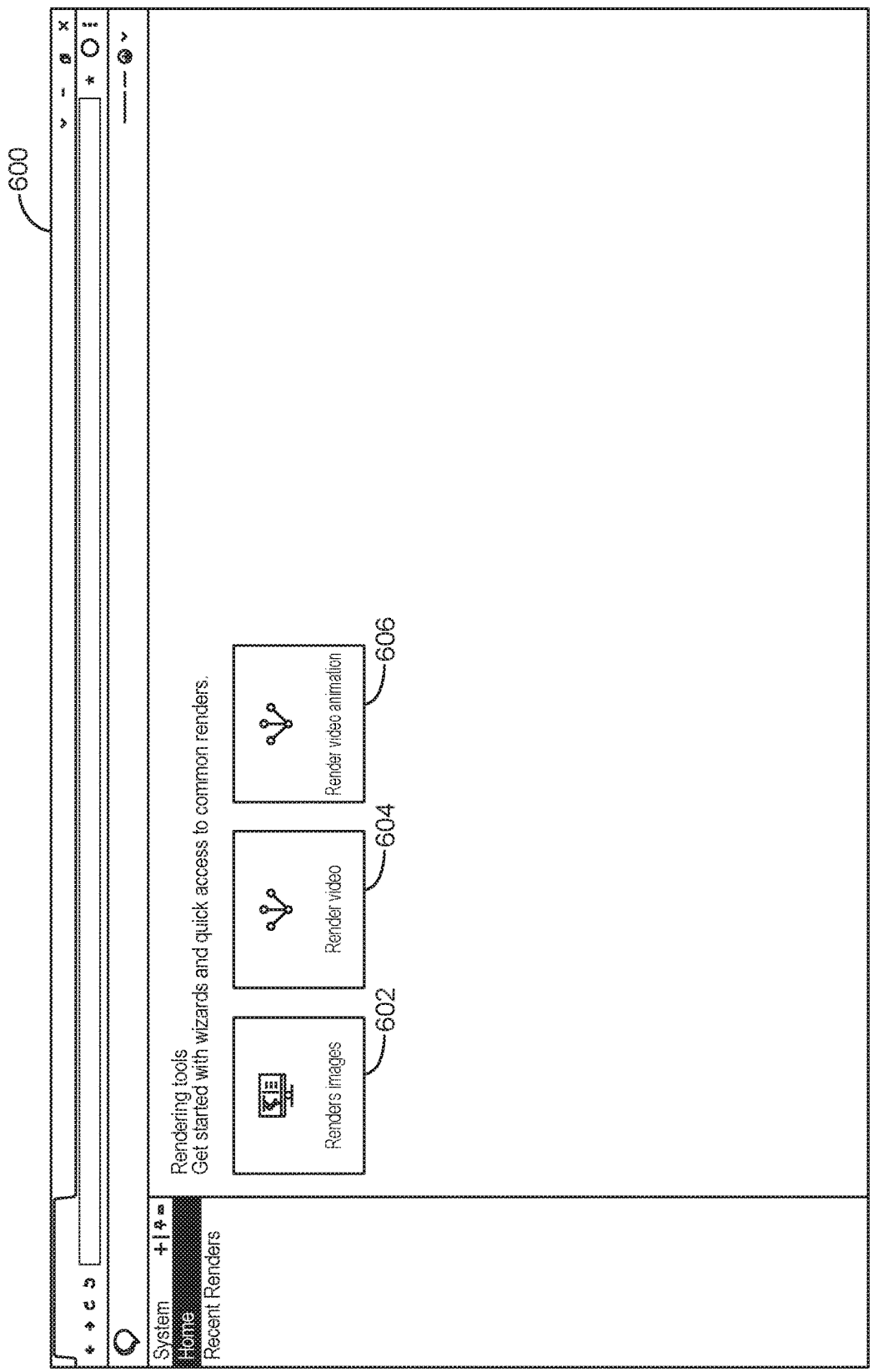
FIG. 6 is an interface displaying a Rendering as a Service (RaaS) application main menu, according to some embodiments.

Referring now to FIG. 6, an interface 600 is shown, according to an exemplary embodiment. In an exemplary embodiment, the interface 600 is a RaaS application main menu interface. As shown, the interface 600 includes a plurality of selectable icons. Each of the selectable icons may be associated with a service, for example a rendering service.

As shown, the interface 600 includes a first service icon 602, a second service icon 604, and a third service icon 606. In an exemplary embodiment, the first service icon 602 is associated with an image rendering service, the second service icon 604 is associated with a video rendering service, and the third service icon 606 is associated with an animation rendering service. Each of the icons 602-606 may be selectable, for example such that in response to a selection the operator is directed to one or more interfaces associated with the related service. For example, in response to a selection of the third service icon 606, an operator may be directed to an animation rendering project interface.

Figure 7:
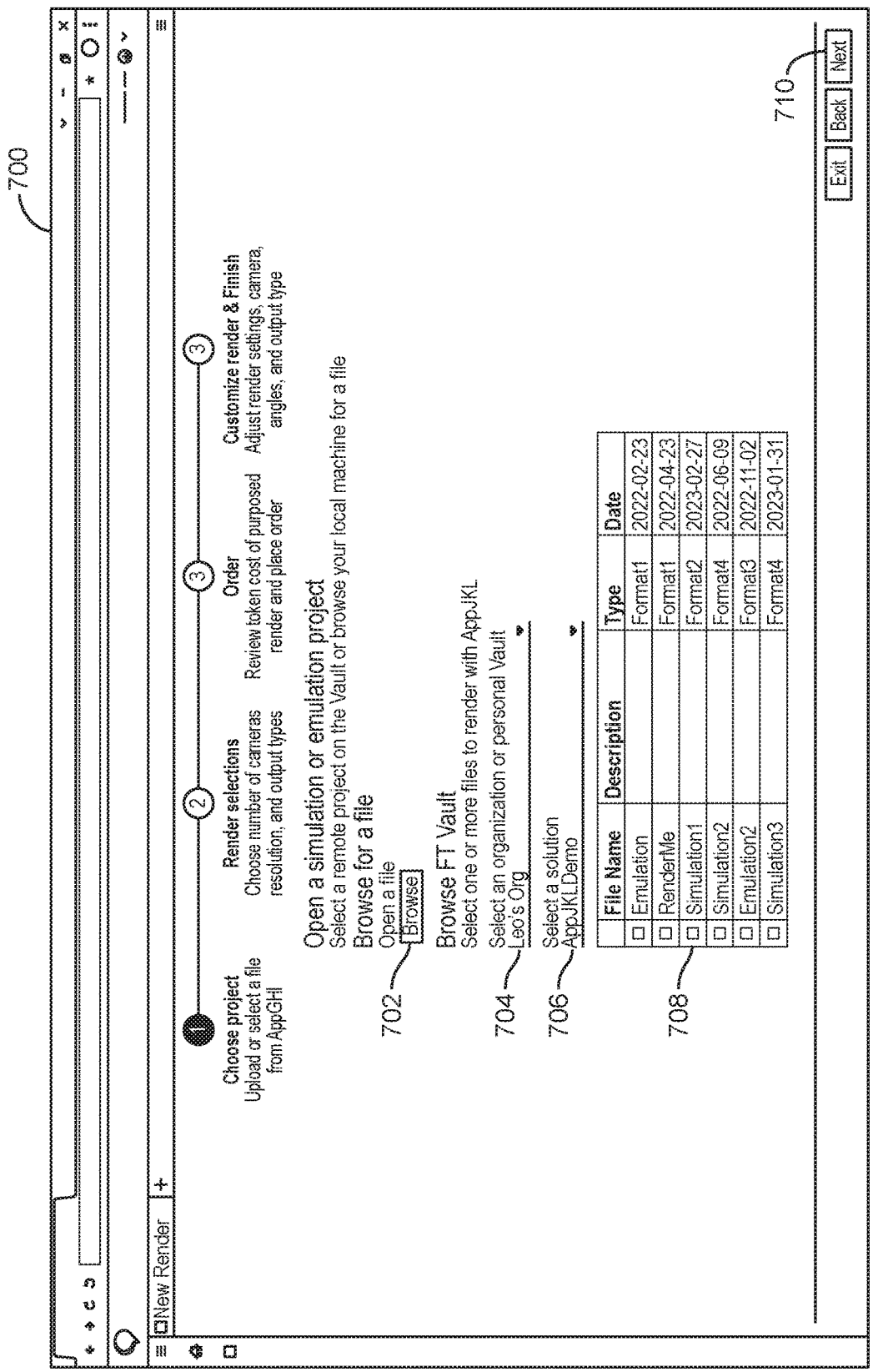
FIG. 7 is an interface displaying a rendering project display, according to some embodiments.

Referring now to FIG. 7, an interface 700 is shown, according to an exemplary embodiment. In an exemplary embodiment, the interface 700 is a rendering project interface. For example, the interface 700 may be an animation rendering project interface, which may be populated in response to a selection of an icon (e.g., third service icon 606, associated with an animation rendering service) on the interface 600. As shown, the interface 700 includes a plurality of selectable icons. Each of the selectable icons may be associated with information relating to an object to be rendered.

As shown, the interface 700 includes an object selection icon 702, a source selection icon 704, a rendering list selection 706, and a rendering list display 708. According to an exemplary embodiment, the object selection icon 702 is used to select an object to be rendered. For example, the object selection icon 702 can be used to browse for and/or select (e.g., identify) a 3D model to be rendered. In an exemplary embodiment, the 3D model is of a piece of industrial equipment, or an industrial environment. In other embodiments, the object is an image, a video, and/or another animation. The source selection icon 704 can be used to select a location of the object to be rendered. For example, the source selection icon 704 can be used to browse and/or select (e.g., identify) a local storage device where the object is stored or saved. In other embodiments, the source selection icon 704 may be used to browse and/or select (e.g., identify) a source where the object is stored, for example within an external device (e.g., the user device 110, etc.) and/or system (e.g., the storage system 118, the industrial system 106, the VR system 104, etc.).

According to an exemplary embodiment, the rendering list selection 706 is used to browse for and/or select (e.g., identify) characteristics or qualities associated with historical (e.g., saved) renderings. For example, the rendering list selection 706 may be used to browse the historic renderings displayed on the rendering list display 708. Each of the renderings displayed on the rendering list display 708 may have unique attributes associated with the render (e.g., an object rendered, a resolution or viewpoint of the rendering, etc.). In this regard, the rendering list selection 706 may be used to reproduce and/or replicate historic renderings, and/or generate new renderings having similar qualities or characteristics as historic renderings. Once an object to be rendered has been selected (e.g., via the object selection icon 702) and/or a source of the object has been selected (e.g., via the source selection icon 704), a "next" icon 710 may be selected, which may direct an operator to a rendering options interface.

Figure 8:
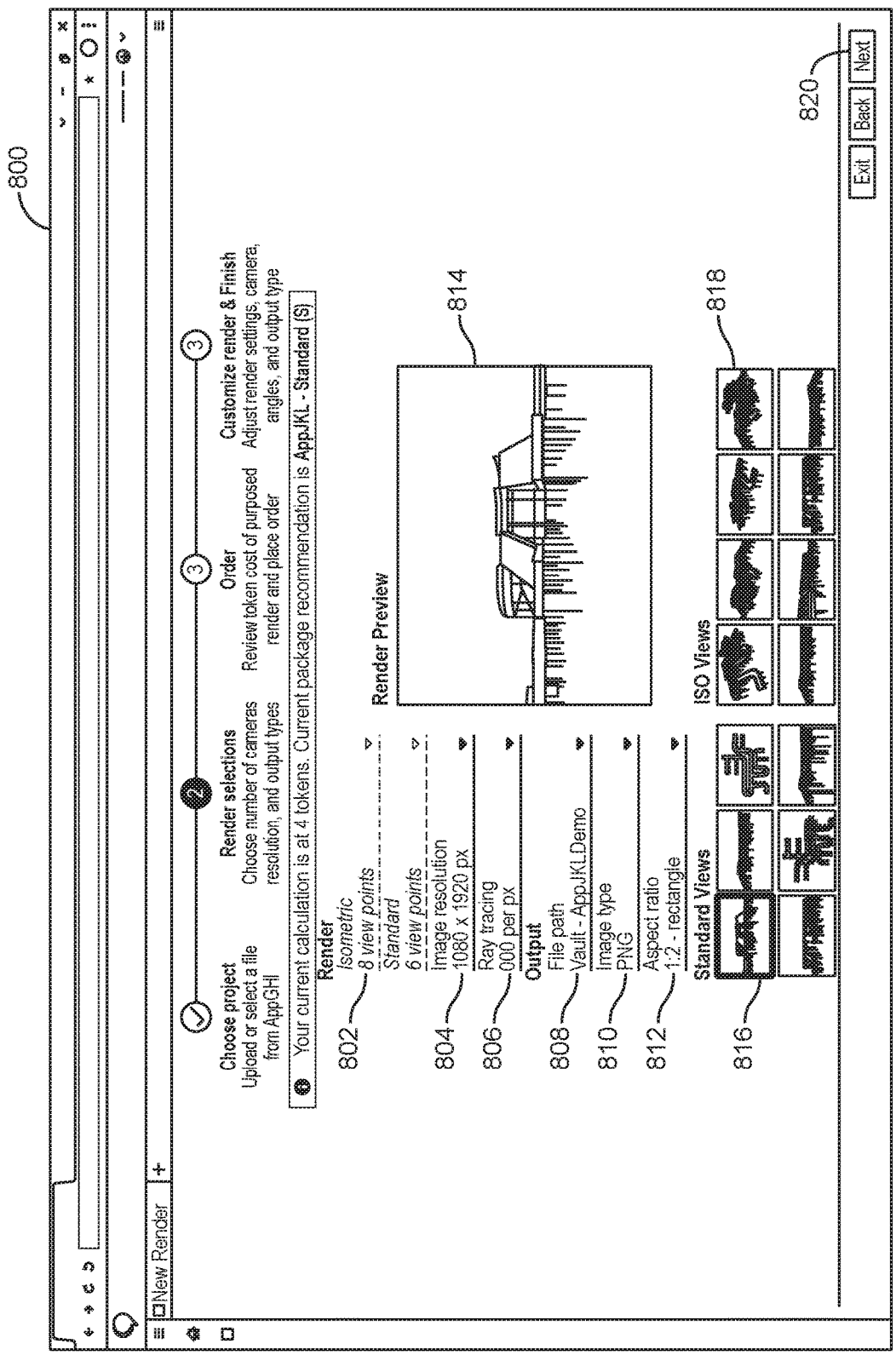
FIG. 8 is an interface displaying a rendering options display, according to some embodiments.

Referring now to FIG. 8, an interface 800 is shown, according to an exemplary embodiment. In an exemplary embodiment, the interface 800 is a rendering options interface. In an exemplary embodiment, after an operator selects an object (e.g., a 3D model, an animation, a video, an image, etc.) to be rendered, the interface 800 is populated. The interface 800 may display a plurality of selectable rendering options (e.g., selectable rendering icons). Each of the selectable rendering options may be associated with one or more characteristics or qualities associated with the rendering that is to be generated.

As shown, the interface 800 includes a rendering view icon 802, a rendering resolution icon 804, and a rendering ray tracing icon 806. According to an exemplary embodiment, the rendering view icon 802 is selectable to choose one or more views associated with the rendering that is to be generated (e.g., the rendering of the object). For example, the rendering view icon 802 may be used to select an isometric view, such that the rendering that is generated is an isometric view of the object (e.g., having 8 view points). In other embodiments, the rendering view icon 802 may be selected, such that the rendering that is generated is a standard view of the object (e.g., having 6 view points). According to an exemplary embodiment, the rendering resolution icon 804 is selectable to select (e.g., determine, establish, etc.) a resolution of the rendering that is to be generated. Similarly, the rendering ray tracing icon 806 may be selectable to select (e.g., determine, establish, etc.) a ray tracing number of the rendering that is to be generated.

As shown, the interface 800 further includes an output path icon 808, a rendering file type icon 810, and an aspect ratio selection icon 812. According to an exemplary embodiment, the output path icon 808 is used to select a location where the rendering that is generated is to be output. For example, the output path icon 808 may be used to browse and/or select a storage device, for example to store the object rendering after the object is rendered. In an exemplary embodiment, the rendering file type icon 810 is used to select an output format (e.g., file type, etc.) of the rendering that is generated. For example, the rendering file type icon 810 may be used to select a 3D modeling data format (e.g., USD, etc.), an image or video file format, and/or another suitable file format. The aspect ratio selection icon 812 may be selectable to select (e.g., determine, establish, etc.) as aspect ratio of the rendering that is to be generated.

As shown, the interface 800 further includes at least one preview display. For example, the interface 800 is shown to include a render preview display 814, which displays a preview of the rendering to be generated. The interface 800 is also shown to include a first render view preview display 816, and a second render view preview display 818, which may display the different points of view associated with the different views selectable using the rendering view icon 802. In an exemplary embodiment, the points of view displays of each of the first and second render view preview displays 816, 818 are selectable, for example to populate the selected point of view of the rendering within the render preview display 814. According to an exemplary embodiment, once the one or more selectable characteristics or qualities of the rendering that is to be generated have been selected (e.g., via icons 802-812), a "next" icon 820 may be selected, which may direct an operator to a rendering cost interface.

Figure 9:
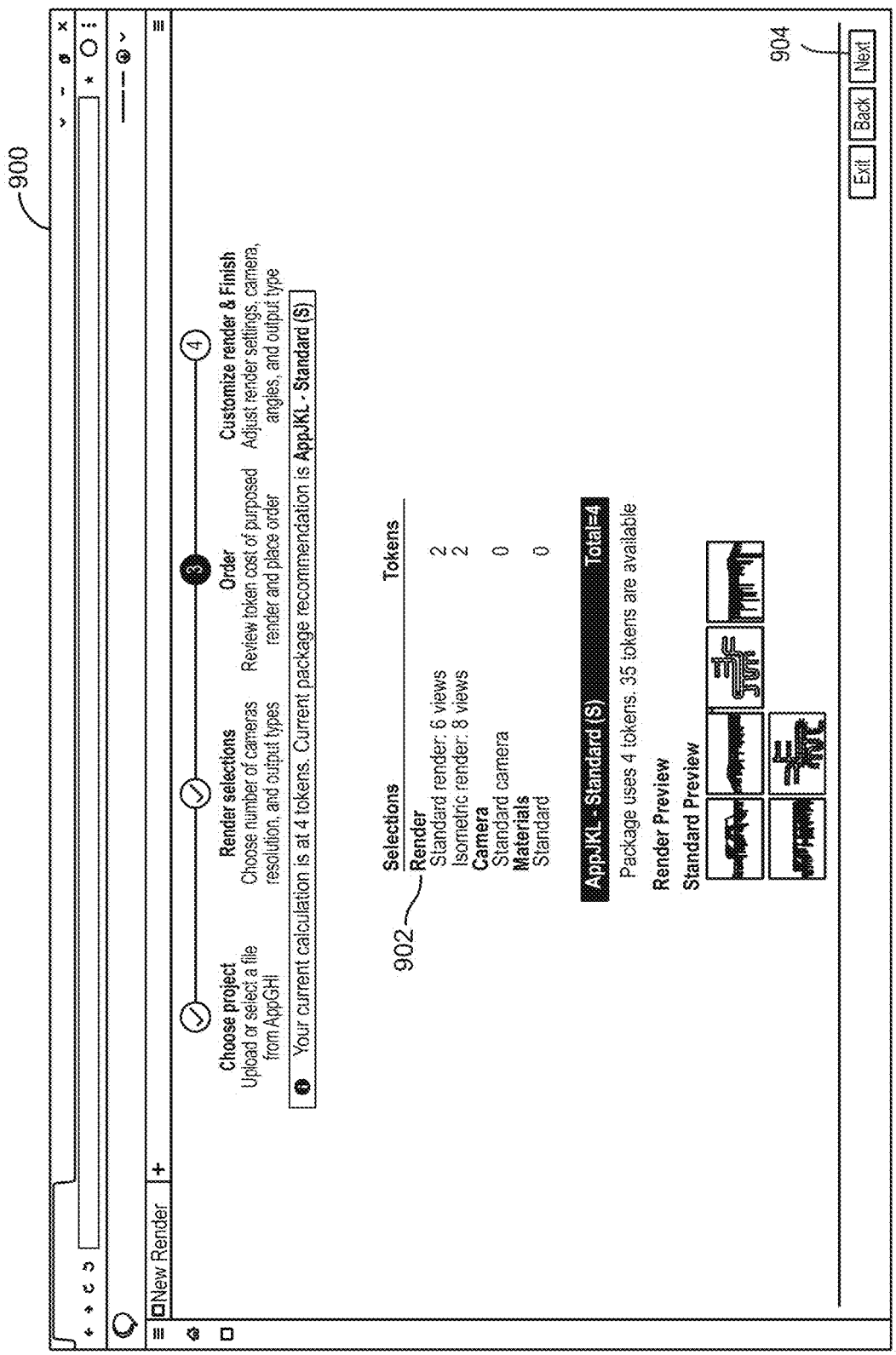
FIG. 9 is an interface displaying a rendering cost display, according to some embodiments.

Referring now to FIG. 9, an interface 900 is shown, according to an exemplary embodiment. In an exemplary embodiment, the interface 900 is a rendering cost interface. In an exemplary embodiment, after an operator selects one or more selectable characteristics or qualities of the rendering that is to be generated, the interface 900 is populated. The interface 900 may display information associated with the rendering that is to be generated.

As shown, the interface 900 includes a rendering cost display 902. The rendering cost display 902 may display an itemized cost associated with each portion of the proposed rendering that is to be generated (e.g., a rendering cost, a camera cost, a materials cost, etc.), as well as a total cost associated with the proposed rendering that is to be generated. Once an operator or user has reviewed the invoice and/or proposed costs associated with the rendering that is to be generated, a "next" icon 904 may be selected, which may direct an operator to a rendering finalization interface.

Figure 10:
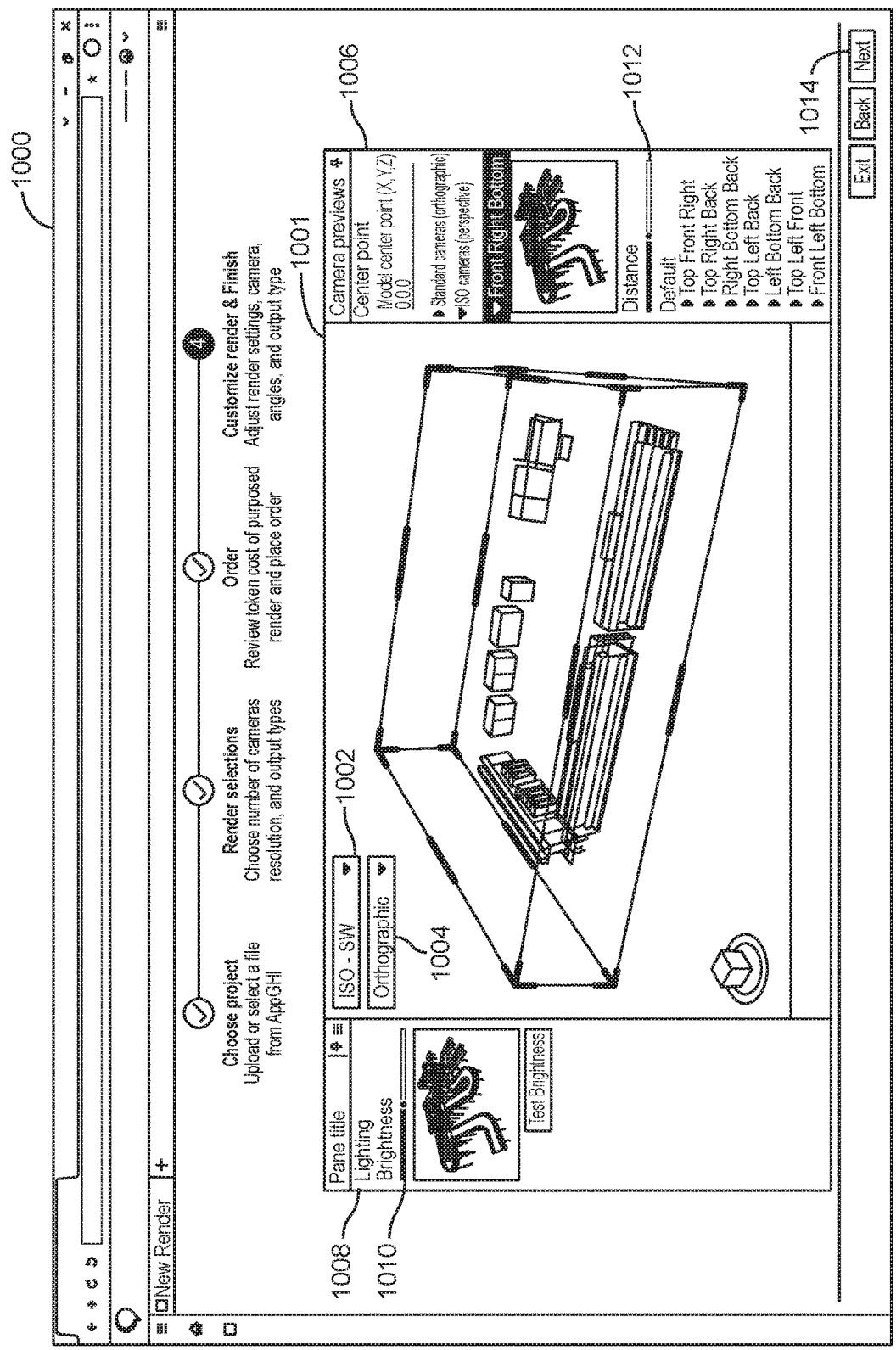
FIG. 10 is an interface displaying a rendering finalization display, according to some embodiments.

Referring now to FIG. 10, an interface 1000 is shown, according to an exemplary embodiment. In an exemplary embodiment, the interface 1000 is a rendering finalization interface. The interface 1000 may display a plurality of selectable rendering options (e.g., selectable rendering icons). Each of the selectable rendering options may be associated with one or more characteristics or qualities associated with the rendering that is to be generated.

As shown, the interface 1000 includes a render preview display 1001. The render preview display 1001 may display a preview of the object rendering that is to be generated. As shown, the interface 1000 also includes a projection selection icon 1002, a point of view icon 1004, and a center selection icon 1006. According to an exemplary embodiment, the projection selection icon 1002 is used to select a projection of the object in the rendering that is to be generated (e.g., a southwest isometric projection, etc.), the point of view icon 1004 is used to select a point of view of the object in the rendering that is to be generated (orthographic, etc.), and the center selection icon 1006 is used to select a center point of the object in the rendering that is to be generated. Upon selection of any or all of the projection, point of view, and/or the center, the render preview display 1001 may be updated to display a preview of the object rendering that is to be generated (e.g., having the selected characteristics).

As shown, the interface 1000 also includes a lighting selection icon 1008, a lighting toggle 1010, and a camera distance toggle 1012. In an exemplary embodiment, the lighting selection icon 1008 is used to select a light source and/or a location of a light source that is to be used to illuminate the object in the rendering that is to be generated. Further, the lighting toggle 1010 may be used to select a brightness level of the light that is to be used to illuminate the object in the rendering. In an exemplary embodiment, the camera distance toggle 1012 is used to select a distance between a virtual camera (e.g., in 3D space) that provides the perspective and/or views of the object in the rendering that is to be generated. Upon selection of any or all of the light source and/or location, light brightness, and/or camera distance, the render preview display 1001 may be updated to display a preview of the object rendering that is to be generated (e.g., having the selected characteristics).

According to an exemplary embodiment, the interface 1000 also includes a path selection icon. In an exemplary embodiment, the path selection icon may be used to define a movement path, for example around and/or through the object to be rendered (e.g., via the object depicted on the preview display 1001). The movement path may devise a movement path of a virtual camera in a 3D space around (or through) components of the object to be rendered when generating the object rendering. In this sense, the virtual camera may provide a perspective of the object in the rendering that is to be generated, and/or the virtual camera may provide additional views as the virtual camera moves along the movement path in the rendering. According to an exemplary embodiment, once the one or more selectable characteristics or qualities of the rendering that is to be generated have been selected (e.g., via icons 1004-1012), a "next" icon 1014 may be selected, which may direct an operator to a rendering interface.

Figure 11:
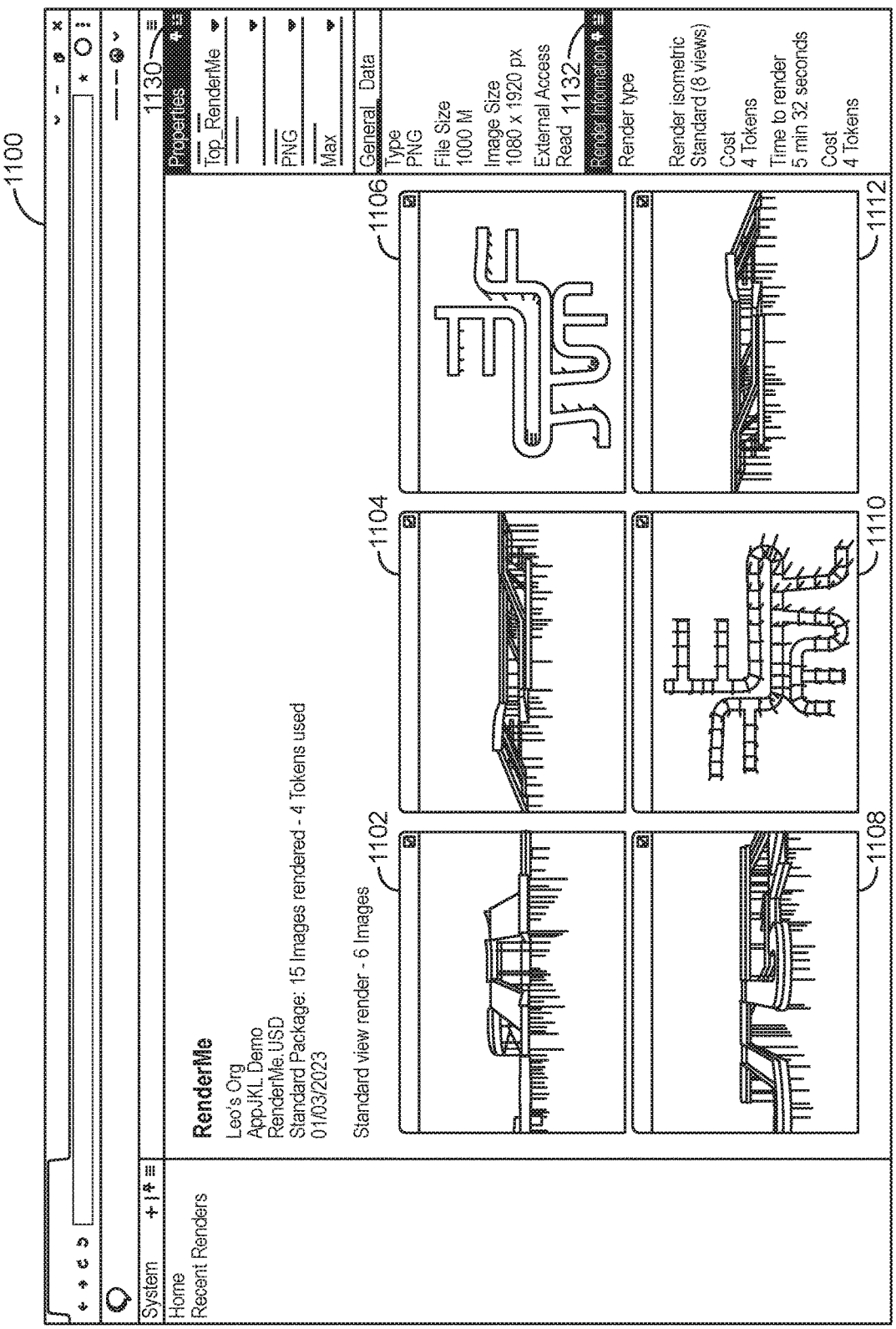
FIG. 11 is an interface displaying a rendering display, according to some embodiments.
Figure 12:
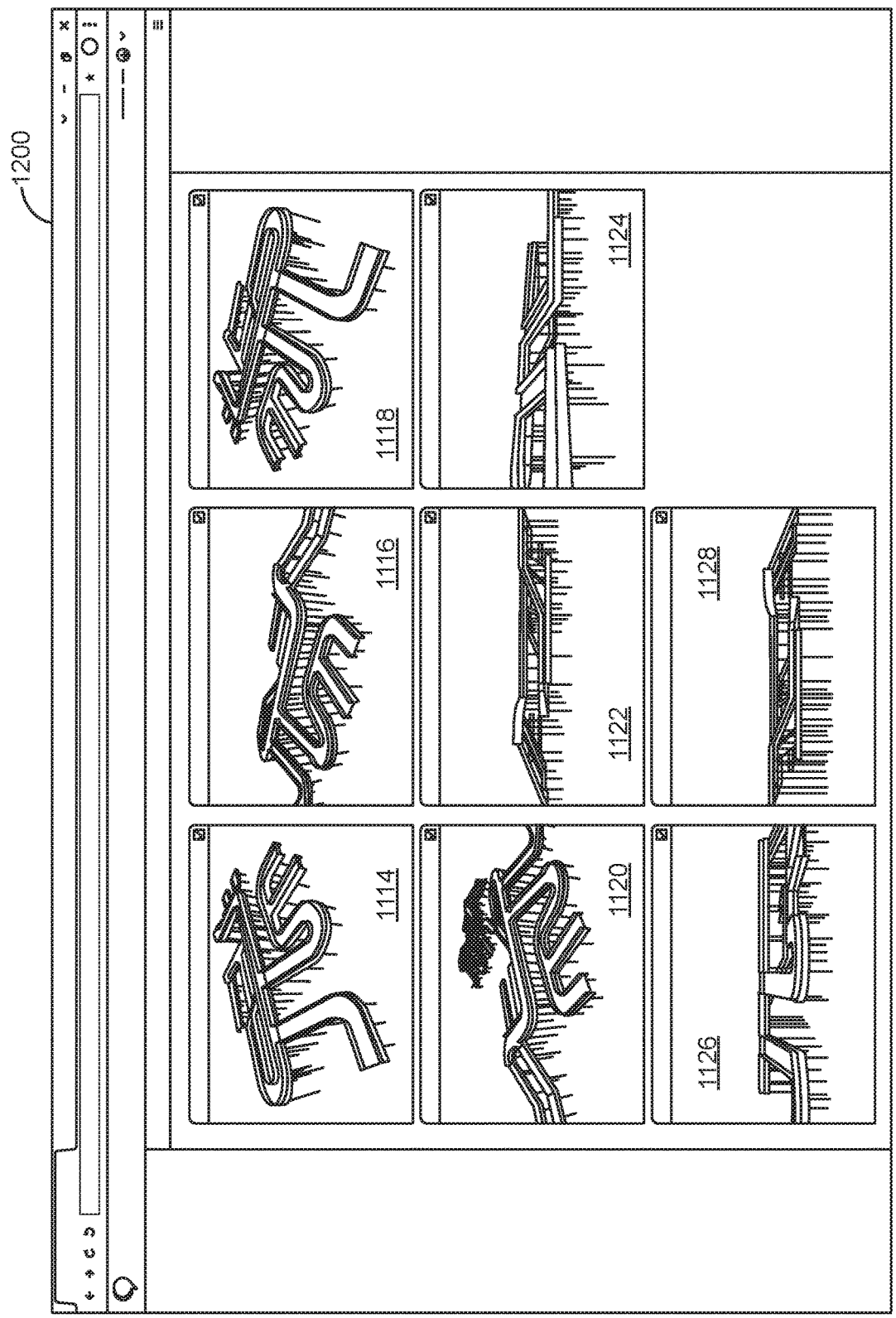
FIG. 12 is an interface displaying a rendering display, according to some embodiments.

Referring now to FIGS. 11-12, interface 1100 and interface 1200 are shown, according to an exemplary embodiment. In an exemplary embodiment, the interfaces 1100-1200 are rendering interfaces. According to an exemplary embodiment, interfaces 1100-1200 present a plurality of displays (e.g., views) illustrating the rendering of the object. For example, the interfaces 1100-1200 may display a plurality of 2D images of the rendered object (e.g., the rendered 3D model). In other embodiments, the interface 1100 and/or the interfaces 1200 display a 3D model, a video, an animation, or another suitable visual representation of the rendered object.

As shown in FIGS. 11-12, the interfaces 1100-1200 display the rendered object from a plurality of perspectives. For example, the interfaces 1100-1200 may display a first top view 1102, a first bottom view 1104, a first front view 1106, a first back view 1108, a second back view 1110, a third back view 1112, a second top view 1114, a second bottom view 1116, a second front view 1118, a fourth back view 1120, a third bottom view 1122, a third front view 1124, a fifth back view 1126, and a fourth bottom view 1128. The interface 1100 is shown to further includes a render properties display 1130, for example to display information (e.g., name, description, filed type, resolution level, etc.) associated with the rendering. The interface 1100 is further shown to include a render information display 1132, for example to display additional information (e.g., a render view or perspective, a rendering cost, a time to render the object, etc.) associated with the rendering. According to an exemplary embodiment, once the object rendering has been rendered and/or displayed or presented (e.g., via the interfaces 1100-1200, etc.), the object rendering can be transmitted to another device or system (e.g., the VR system 104, the user device 110, the industrial system 106, the third-party system 114, the storage system 118, etc.) and/or saved for subsequent rendering generation or analysis, as discussed herein.

Figure 13:
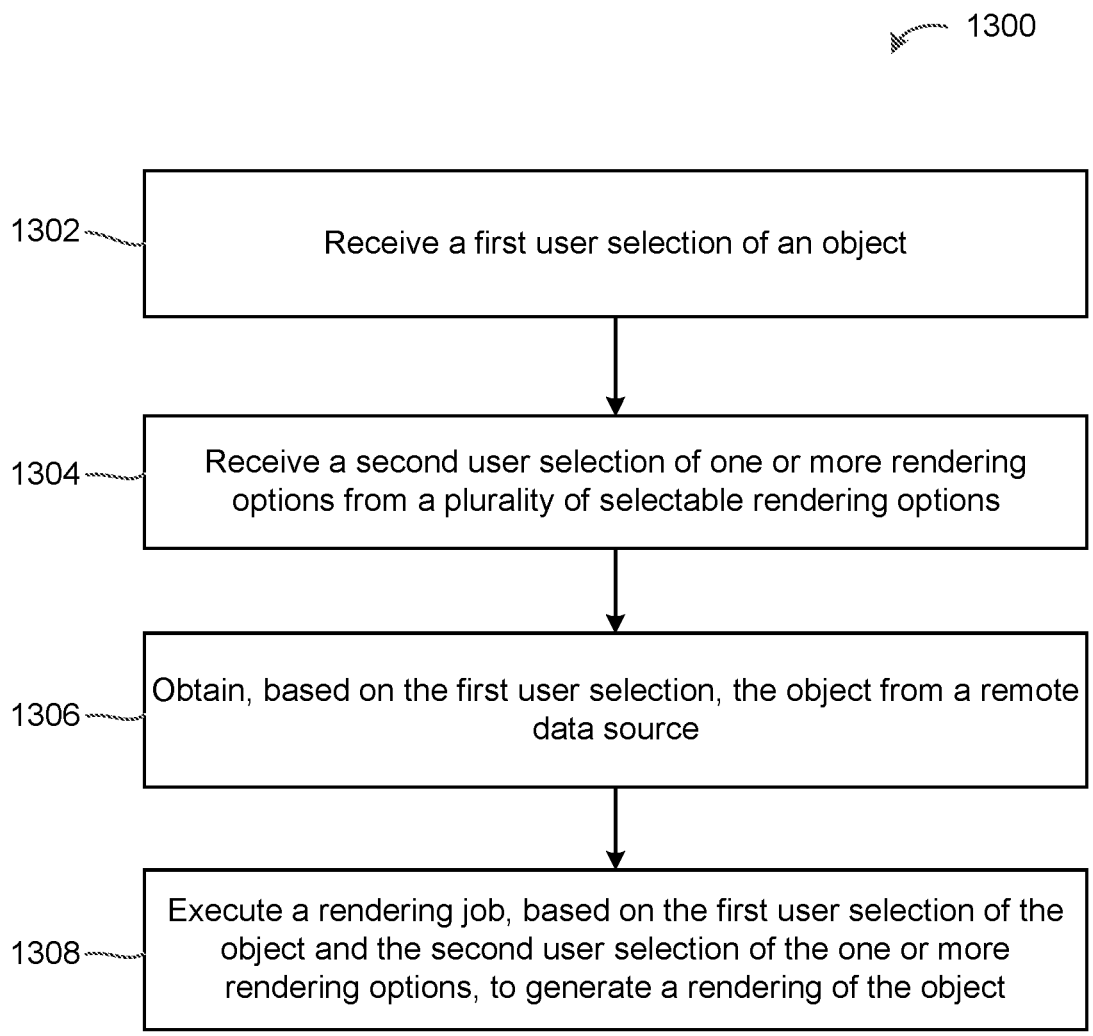
FIG. 13 is a flow diagram of a process of generating a rendering of industrial equipment, according to some embodiments.

Referring now to FIG. 13, a process 1300 for providing and/or generating a rendering of an object (e.g., a 3D model of industrial equipment, etc.) is shown, according to an exemplary embodiment. Process 1300 may be implemented by any and/or all of the components of the web services system 100 of FIGS. 1-2 (e.g., the rendering platform 102, etc.). It should be appreciated that any and/or all of the process 1300 may be implemented by other systems, devices, and/or components (e.g., components of the web services system 100, the rendering platform 102, etc.). It should also be appreciated that in some embodiments, process 1300 may be implemented using additional, different, and/or fewer steps.

Process 1300 is shown to include receiving a first user selection of an object to be rendered (step 1302), according to an exemplary embodiment. In an exemplary embodiment, the first user selection of the object is a user selection of a three-dimensional model of industrial equipment to be rendered. The first user selection may be received via a user interaction with a graphical user interface presented on a user device (e.g., the user device 110, via the user interface 112, etc.). In other embodiments, the first user selection is received via a user interaction with an interface on another device or system (e.g., the industrial system 106, the industrial application 108, the third-party system 114, the third-party application 116, etc.). In some embodiments, the first user selection of the object is a user selection of a video, an image, an animation, or another suitable visual representation (e.g., of industrial equipment, of an industrial environment, etc.).

Process 1300 is shown to include receiving a second user selection of one or more rendering options from a plurality of selectable rendering options (step 1304), according to an exemplary embodiment. In an exemplary embodiment, the second user selection is received via a user interaction with a graphical user interface (e.g., presented on a user device, etc.). According to an exemplary embodiment, the plurality of selectable rendering options includes a perspective or viewpoint of a virtual camera from which to view the 3D model when generating the object rendering. In some embodiments, the plurality of selectable rendering options includes an identification of a light source used to illuminate the 3D model when generating the object rendering, and/or a light source placement used when generating the object rendering. In other embodiments, the plurality of selectable rendering options includes an identification of a movement path of a virtual camera in a 3D space around or through components of the 3D model.

In some embodiments, the process 1300 includes receiving a third user selection of a rendering format. The third user selection may be received along with the first user selection (e.g., of the object). According to an exemplary embodiment, the rendering format identifies a format of the object to be rendered. For example, the rendering format may be a universal scene description, an image file format, a video format, an animation file format, a 3D virtual modeling format, and/or another suitable format. In some embodiments, the process 1300 includes receiving a third user selection of a view and/or resolution of the rendering to be generated. The view and/or resolution may identify a view and/or resolution of the object to be rendered. In other embodiments, process 1300 includes receiving a third user selection of a ray tracing value, an aspect ratio, and/or other suitable characteristic or quality associated with generating the object rendering.

Process 1300 is shown to include obtaining, based on the first user selection, the object from a remote data source (step 1306), according to an exemplary embodiment. In an exemplary embodiment, the object is a 3D model of industrial equipment. In some embodiments, the remote data source is a user device (e.g., the user device 110, via the user interface 112), a virtual reality system (e.g., a metaverse platform of the VR system 104, etc.), and/or another suitable system or device (e.g., the industrial system 106, the storage system 118, etc.). In other embodiments, the remote data source is an application or device (e.g., a virtual modeling application, a commissioning application, a storage application, a local storage device, etc.) associated with the user device (e.g., the user device 110), the virtual reality system (e.g., the VR system 104, etc.), and/or another suitable system or device (e.g., the industrial system 106, the third-party system 114, the storage system 118, etc.). According to an exemplary embodiment, the object is received in a first format. For example, the object may be received in a 3D virtual model data format (e.g., a dwg, .dxf, .arc, or .dae, etc. file format). In other embodiments, the virtual object data is received in another suitable image, video, animation, and/or model data format.

Process 1300 is shown to include executing a rendering job, based on the first user selection of the object and the second user selection of the one or more rendering options, to generate the rendering of the object (step 1308), according to an exemplary embodiment. In an exemplary embodiment, executing the rendering job to generate a rendering of the object includes executing the rendering job to generate a 3D model of industrial equipment. In some embodiments, the object rendering (e.g., 3D model rendering) is in a second format. The second format may be different than the first format. For example, the second format may be a universal scene description (USD) file format, whereas the first format is a (e.g., different) 3D virtual model data format. In other embodiments, the second format is an image or video file format, and the first format is another (e.g., different) suitable image, video, model, and/or animation file format.

In some embodiments, process 1300 includes transmitting the object rendering to a remote device, for example for use in representing the object in an interactive environment. For example, process 1300 may include transmitting the object rendering (e.g., 3D model rendering) to the user device 110 for use, display, and/or manipulation within an application or platform associated with the user device 110 (e.g., via the user interface 112). In other embodiments, process 1300 includes transmitting the object rendering (e.g., 3D model rendering) to the VR system 104 (e.g., a metaverse platform associated with the VR system 104, etc.), the industrial system 106, and/or the third-party system 114, for example for use in an interactive environment associated with the system. In yet other embodiments, the object rendering (e.g., 3D model rendering) is transmitted to the storage system 118 (e.g., the database 120), for example for storage and/or subsequent rendering generation and/or processing. In an exemplary embodiment, the object rendering (e.g., 3D model rendering) may be transmitted to any suitable combination (or all) of the components described herein (e.g., components of the web services system 100).

Figure 14:
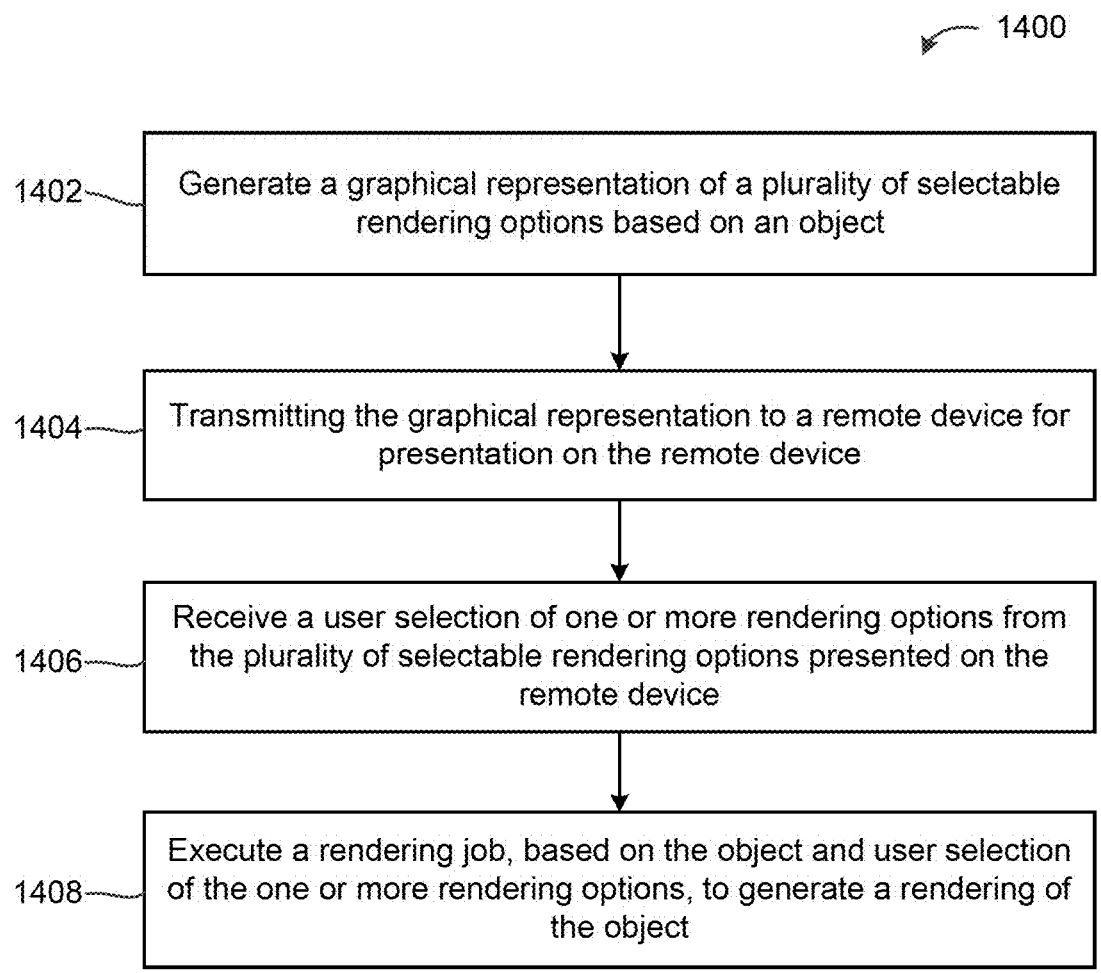
FIG. 14 is a flow diagram of a process of generating a rendering of industrial equipment, according to some embodiments.

Referring now to FIG. 14 a process for providing and/or generating a rendering of an object (e.g., a 3D model of industrial equipment, etc.) is shown, according to an exemplary embodiment. Process 1400 may be implemented by any and/or all of the components of the web services system 100 of FIGS. 1-2 (e.g., the rendering platform 102, etc.). It should be appreciated that any and/or all of the process 1400 may be implemented by other systems, devices, and/or components (e.g., components of the web services system 100, the rendering platform 102, etc.). It should also be appreciated that in some embodiments, process 1400 may be implemented using additional, different, and/or fewer steps.

Process 1400 is shown to include generating a graphical representation of a plurality of selectable rendering options based on an object (step 1402), according to an exemplary embodiment. In an exemplary embodiment, the object is a three-dimensional model of industrial equipment to be rendered. According to an exemplary embodiment, the graphical representation is presented via a graphical user interface presented on a user device (e.g., the user device 110, via the user interface 112, etc.). In other embodiments, the graphical representation is presented via an interface on another device or system (e.g., the industrial system 106, the industrial application 108, the third-party system 114, the third-party application 116, etc.).

According to an exemplary embodiment, the plurality of selectable rendering options includes a plurality of views of the object (e.g., 3D model) from a plurality of different viewpoints of a virtual camera. For example, the plurality of views of the object (e.g., 3D model) may be a perspective or viewpoint of a virtual camera from which to view the 3D model when generating an object rendering. In some embodiments, the plurality of selectable rendering options includes user-selectable options for selecting one or more of the plurality of views. In an exemplary embodiment, the plurality of selectable rendering options includes an identification of a light source used to illuminate the 3D model when generating the object rendering, and/or a light source placement used when generating the object rendering. In some embodiments, the plurality of selectable rendering options includes an identification of a movement path of a virtual camera in a 3D space around or through components of the object (e.g., 3D model), for example where the virtual camera moves along the movement path when generating the object rendering. In other embodiments, the plurality of selectable rendering options includes an identification of a center point of the object (e.g., 3D model of industrial equipment, etc.) used when generating the rendering of the object. In yet other embodiments, the plurality of selectable rendering options includes an identification of a distance of the virtual camera from the center point of the object (e.g., 3D model).

Process 1400 is shown to include transmitting the graphical representation to a remote device for presentation on the remote device (step 1404), according to an exemplary embodiment. As discussed above, the graphical representation may be transmitted to a user device (e.g., the user device 110, etc.), for example for presentation on an interface of the user device (e.g., the user interface 112, etc.). In other embodiments, the graphical representation is transmitted to another device or system (e.g., the industrial system 106, the industrial application 108, the third-party system 114, the third-party application 116, etc.), for example for presentation via an interface of the device or system.

Process 1400 is shown to include receiving a user selection of one or more rendering options from the plurality of selectable rendering options presented on the remote device (step 1406), according to an exemplary embodiment. As noted above, the one or more rendering options may relate to a view of the object (e.g., 3D model) selected from a plurality of different viewpoints of a virtual camera, an identification of a light source and/or placement of the light source used to illuminate the 3D model when generating the object rendering, and/or an identification of a movement path of a virtual camera in a 3D space around or through components of the object (e.g., 3D model) when generating the object rendering. In other embodiments, the one or more rendering options relates to an identification of a center point of the object (e.g., 3D model of industrial equipment, etc.) used when generating the rendering of the object, and/or an identification of a distance of the virtual camera from the center point of the object (e.g., 3D model).

Process 1400 is shown to include executing a rendering job, based on the object and the user selection of the one or more rendering options, to generate a rendering of the object (step 1408), according to an exemplary embodiment. According to an exemplary embodiment, executing the rendering job to generate a rendering of the object includes executing the rendering job to generate a 3D model of industrial equipment. In some embodiments, process 1400 includes transmitting the object rendering to a remote device, for example for use in representing the object in an interactive environment. For example, process 1400 may include transmitting the object rendering (e.g., 3D model rendering) to the user device 110 for use, display, and/or manipulation within an application or platform associated with the user device 110 (e.g., via the user interface 112). In other embodiments, process 1400 includes transmitting the object rendering (e.g., 3D model rendering) to the VR system 104 (e.g., a metaverse platform associated with the VR system 104, etc.), the industrial system 106, and/or the third-party system 114, for example for use in an interactive environment associated with the system. In yet other embodiments, the object rendering (e.g., 3D model rendering) is transmitted to the storage system 118 (e.g., the database 120), for example for storage and/or subsequent rendering generation and/or processing. In an exemplary embodiment, the object rendering (e.g., 3D model rendering) may be transmitted to any suitable combination (or all) of the components described herein (e.g., components of the web services system 100).

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

In various implementations, the steps and operations described herein may be performed on one processor or in a combination of two or more processors. For example, in some implementations, the various operations could be performed in a central server or set of central servers configured to receive data from one or more devices (e.g., edge computing devices/controllers) and perform the operations. In some implementations, the operations may be performed by one or more local controllers or computing devices (e.g., edge devices), such as controllers dedicated to and/or located within a particular industrial environment or portion of an industrial environment. In some implementations, the operations may be performed by a combination of one or more central or offsite computing devices/servers and one or more local controllers/computing devices. All such implementations are contemplated within the scope of the present disclosure. Further, unless otherwise indicated, when the present disclosure refers to one or more computer-readable storage media and/or one or more controllers, such computer-readable storage media and/or one or more controllers may be implemented as one or more central servers, one or more local controllers or computing devices (e.g., edge devices), any combination thereof, or any other combination of storage media and/or controllers regardless of the location of such devices.

What is claimed is:

1. A method for generating a rendering of industrial equipment, the method comprising:
   receiving a render request from a first remote data source, the render request identifying a three-dimensional (3D) model of the industrial equipment to be rendered;
   generating a virtual object request based on the render request, the virtual object request identifying a second remote data source comprising virtual object data associated with the 3D model to be rendered;
   receiving the virtual object data from the second remote data source based on the virtual object request, wherein the virtual object data is in a first format;
   generating a 3D model rendering based on the virtual object data and subject to a conversion constraint comprising a tokenized cost associated with generating the 3D model rendering, wherein the 3D model rendering is in a second format different than the first format; and
   transmitting the 3D model rendering to the first remote data source for use in representing the industrial equipment in an interactive environment.

2. The method of claim 1, further comprising:
   generating, based on the render request, a plurality of job tasks associated with generating the 3D model rendering; and
   generating, based on an ordering of the plurality of job tasks, a jobs task queue, wherein the jobs task queue is ordered to increase efficiencies affecting the tokenized cost associated with generating the 3D model rendering.

3. The method of claim 2, further comprising:
   generating task data based on the jobs task queue, wherein the task data includes a batch of job tasks selected from the plurality of job tasks of the jobs task queue.

4. The method of claim 3, further comprising:
   generating, based on the task data, a rendering task request, wherein the rendering task request includes a batch of tasks selected from a plurality of tasks associated with generating the 3D model rendering.

5. The method of claim 1, wherein the render request includes a perspective or viewpoint of a virtual camera from which to view the 3D model when generating the 3D model rendering.

6. The method of claim 1, wherein the first remote data source is a user interface of a user device and the second remote data source is a memory device of the user device.

7. The method of claim 1, wherein the first remote data source is a virtual modeling application, and wherein the first remote data source and the second remote data source are different.

8. The method of claim 1, wherein the first remote data source is a metaverse platform, and wherein transmitting the 3D model rendering includes transmitting the 3D model rendering to the metaverse platform for use in representing the industrial equipment in an interactive virtual environment.

9. The method of claim 1, wherein the render request includes at least one of an identification of a light source used to illuminate the 3D model when generating the 3D model rendering, a light source placement used when generating the 3D model rendering, an identification of a movement path of a virtual camera in a 3D space around or through components of the 3D model, wherein the 3D model rendering is from a perspective of the virtual camera as the virtual camera moves along the movement path.

10. The method of claim 1, wherein receiving the virtual object data in the first format includes receiving the virtual object data in a 3D virtual model data format, and wherein generating the 3D model rendering in the second format includes generating the 3D model rendering in a universal scene description file format.

11. The method of claim 1, wherein receiving the virtual object data in the first format includes receiving the virtual object data in a 3D virtual model data format, and wherein generating the 3D model rendering in the second format includes generating the 3D model rendering in an image or video file format.

12. A system for generating a rendering of industrial equipment, the system comprising:
    one or more memory devices having instructions stored thereon that, when executed by one or more processors, cause the one or more processors to perform operations comprising:
       receiving a render request from a first remote data source, the render request identifying a three-dimensional (3D) model of the industrial equipment to be rendered;
       generating a virtual object request based on the render request, the virtual object request identifying a second remote data source comprising virtual object data associated with the 3D model to be rendered;
       receiving the virtual object data from the second remote data source based on the virtual object request, wherein the virtual object data is in a first format;
       generating a 3D model rendering based on the virtual object data and subject to a conversion constraint comprising a tokenized cost associated with generating the 3D model rendering, wherein the 3D model rendering is in a second format different than the first format; and
       transmitting the 3D model rendering to the first remote data source for use in representing the industrial equipment in an interactive environment.

13. The system of claim 12, wherein the operations further comprise:
    generating, based on the render request, a plurality of job tasks associated with generating the 3D model rendering; and
    generating, based on an ordering of the plurality of job tasks, a jobs task queue, wherein the jobs task queue is ordered to increase efficiencies affecting the tokenized cost associated with generating the 3D model rendering.

14. The system of claim 13, wherein the operations further comprise:
    generating task data based on the jobs task queue, wherein the task data includes a batch of job tasks selected from the plurality of job tasks of the jobs task queue.

15. The system of claim 14, wherein the operations further comprise:
    generating, based on the task data, a rendering task request, wherein the rendering task request includes a batch of tasks selected from a plurality of tasks associated with generating the 3D model rendering.

16. The system of claim 12, wherein the render request includes a perspective or viewpoint of a virtual camera from which to view the 3D model when generating the 3D model rendering.

17. A non-transitory computer readable medium comprising instructions stored thereon that, when executed by one or more processors, cause the one or more processors to:

receive a render request from a first remote data source, the render request identifying a three-dimensional (3D) model of the industrial equipment to be rendered;

generate a virtual object request based on the render request, the virtual object request identifying a second remote data source comprising virtual object data associated with the 3D model to be rendered;

receive the virtual object data from the second remote data source based on the virtual object request, wherein the virtual object data is in a first format;

generate a 3D model rendering based on the virtual object data and subject to a conversion constraint comprising a tokenized cost associated with generating the 3D model rendering, wherein the 3D model rendering is in a second format different than the first format; and transmit the 3D model rendering to the first remote data source for use in representing the industrial equipment in an interactive environment.

18. The non-transitory computer readable medium of claim 17, wherein the instructions further cause the one or more processors to:

generate, based on the render request, a plurality of job tasks associated with generating the 3D model rendering; and generate, based on an ordering of the plurality of job tasks, a jobs task queue, wherein the jobs task queue is ordered to increase efficiencies affecting the tokenized cost associated with generating the 3D model rendering.

19. The non-transitory computer readable medium of claim 18, wherein the instructions further cause the one or more processors to:

generate task data based on the jobs task queue, wherein the task data includes a batch of job tasks selected from the plurality of job tasks of the jobs task queue.

20. The non-transitory computer readable medium of claim 19, wherein the instructions further cause the one or more processors to:

generate, based on the task data, a rendering task request, wherein the rendering task request includes a batch of tasks selected from a plurality of tasks associated with generating the 3D model rendering.

* * * * *